US008432443B2

(12) United States Patent
Nam et al.

(10) Patent No.: US 8,432,443 B2
(45) Date of Patent: Apr. 30, 2013

(54) METHOD FOR OBJECT LOCALIZATION USING VISUAL IMAGES WITH REFERENCE COORDINATES

(75) Inventors: Yun Young Nam, Suwon-si (KR); Kyoung Su Park, Suwon-si (KR); Jin Seok Lee, Suwon-si (KR); Sang Jin Hong, New York, NY (US); We Duke Cho, Seongnam-si (KR)

(73) Assignee: Ajou University Industry Cooperation Foundation, Gyeonggi-do (KR)

( * ) Notice: Subject to any disclaimer, the term of this patent is extended or adjusted under 35 U.S.C. 154(b) by 85 days.

(21) Appl. No.: 12/918,535

(22) PCT Filed: Apr. 3, 2008

(86) PCT No.: PCT/KR2008/001867
§ 371 (c)(1),
(2), (4) Date: Aug. 20, 2010

(87) PCT Pub. No.: WO2009/107894
PCT Pub. Date: Sep. 3, 2009

(65) Prior Publication Data
US 2010/0328455 A1    Dec. 30, 2010

(30) Foreign Application Priority Data
Feb. 27, 2008   (KR) .................... 10-2008-0017756

(51) Int. Cl.
*H04N 7/18*   (2006.01)

(52) U.S. Cl.
USPC ........................................... 348/135; 348/139

(58) Field of Classification Search .......... 348/125–143, 348/159
See application file for complete search history.

(56) References Cited

U.S. PATENT DOCUMENTS

| 5,182,641 | A  * | 1/1993 | Diner et al. .................... 348/86 |
| 5,317,394 | A  * | 5/1994 | Hale et al. ................ 348/207.99 |
| 2005/0015005 | A1 | 1/2005 | Kockro ........................ 600/427 |
| 2005/0266921 | A1 | 12/2005 | Hayashida et al. ............. 463/33 |

FOREIGN PATENT DOCUMENTS

| JP | 2000-288248 | 10/2000 |
| JP | 2005-152068 | 6/2005 |
| JP | 2005-319220 | 11/2005 |

OTHER PUBLICATIONS

International Search Report in PCT/KR2008/001867 published Nov. 26, 2008.

* cited by examiner

*Primary Examiner* — Andy Rao
(74) *Attorney, Agent, or Firm* — Harness, Dickey & Pierce, P.L.C.; Anthony G. Fussner; Kisuk Lee

(57) ABSTRACT

There is provided a method of localizing an object comprising projecting an object located on an object plane and a reference point corresponding thereto on a virtual viewable plane and an actual camera plane; estimating coordinates of the reference point; and prescribing a relationship between a location of the object and the coordinates of the reference point.

5 Claims, 30 Drawing Sheets

(a) Large zooming ($z_1$)

(b) Small zooming ($z_2$)

(a) Camera angles and pan factors with respect to global coordinate.

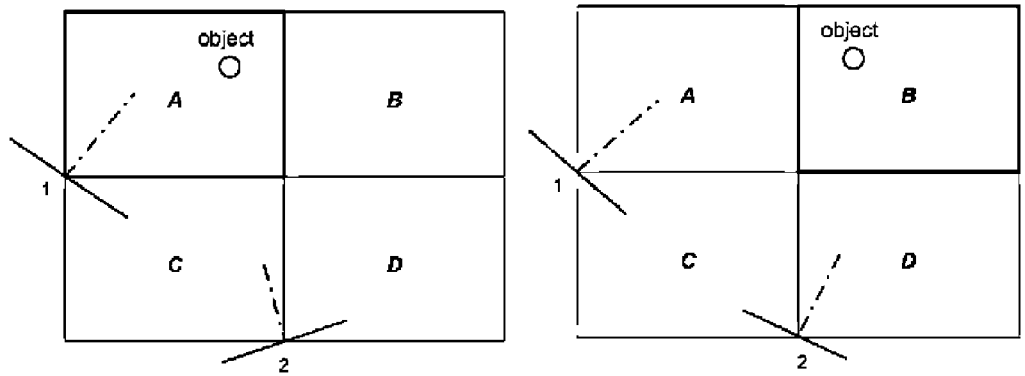
(b) $\theta_{p1}<0$ and $\theta_{p2}<0$     (c) $\theta_{p1}<0$ and $\theta_{p2}>0$
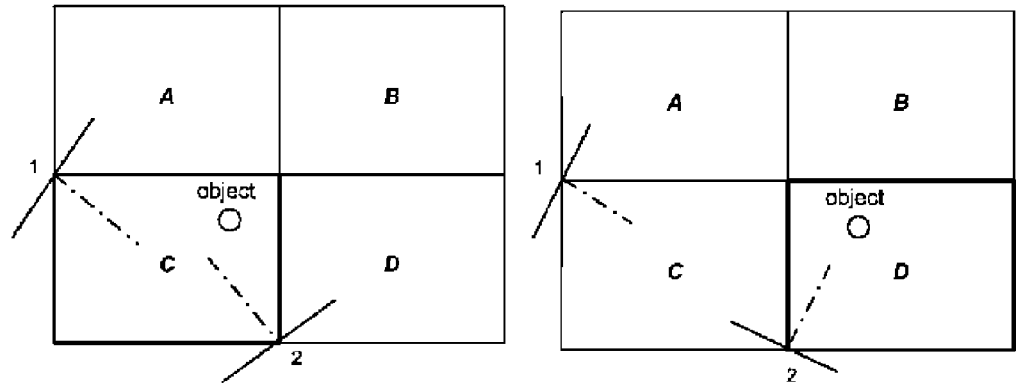
(d) $\theta_{p1}>0$ and $\theta_{p2}<0$     (e) $\theta_{p1}>0$ and $\theta_{p2}>0$
FIG. 7 (b-e)

(a) same axis.  (b) opposite axis.

Original localization        Iteration after localization (a) Camera 1

(b) Camera 2

(a) Error in $x$-axis (b) Error in y-axis (c) Error in $x$-$y$ axis (a) Trajectory performance (b) *x*-axis performance (c) *y*-axis performance

METHOD FOR OBJECT LOCALIZATION USING VISUAL IMAGES WITH REFERENCE COORDINATES

CROSS-REFERENCE TO RELATED APPLICATIONS

This application is a national phase application of PCT Application No. PCT/KR2008/001867 filed on Apr. 3, 2008, which claims the benefit and priority to Korean Patent Application No. 10-2008-0017756 filed Feb. 27, 2008. The entire disclosures of the applications identified in this paragraph are incorporated herein by references.

TECHNICAL FIELD

The present invention relates to a method of localizing an object, and more particularly, to a method of iteratively or not iteratively localizing an object by using reference coordinates and visual images of the reference coordinates using the visual images.

BACKGROUND ART

Object localization is one of the key operations in many applications such as surveillance, monitoring and tracking applications. A tracking system is widely applied in numerous areas such as in military applications as well as in hospitals and offices. In these tracking systems, accuracy of object localization is very critical and poses a considerable challenge. Acoustic sensors have been widely used in many applications due to flexibility, low cost and ease of deployment. An acoustic sensor is sensitive to its surrounding environment with noisy data and does not fully satisfy the requirement of consistent data. Thus, as a reliable tracking method, visual sensors are often applied to tracking and monitoring systems as well. There is provided a simple method for visual localization which allows a robot to determine its absolute position with a view of single landmark in one image. In this algorithm, the image plane is perpendicular to the optical axis and aligned with the optical axis at a distance of its focal length. To track the landmark model, the Lucas-Kanade optical flow algorithm is applied by using gradient descent. This algorithm has feasible real-time performance in indoor environments. However, the approach has the limitation of a pinhole camera model in which only one correspondence can be established.

As an adaptive algorithm, an optical flow-based person tracking algorithm using multiple cameras is presented in an indoor environment. In the algorithm, each camera tracks the target person independently. By exchanging information among cameras, three dimensional positions and the velocities of targets are estimated. In particular, when one of the cameras keeps losing the target by occlusion, the algorithm is more effective since the target position and the velocity in the image are estimated based on the information from other cameras. The target position is obtained from the intersection of projection lines from at least two tracking cameras. Furthermore, in order to estimate the range of depth in a single camera, the algorithm uses a tracking window, which represents the boundary and the height of a detected person in an image plane; thus, the algorithm requires a reliable horizontal position from a completely extracted object region.

There is provided a particle filter based tracking framework which performs multimodal sensors fusion for tracking people in a video-conferencing environment efficiently when multimodal information from multiple cameras and multiple microphone arrays is used to track objects in a scene. For localization, the image coordinates (u,v) in a viewable image are translated to (X,Y,Z) coordinates by using direct linear transformation (DLT). However, in this approach, a calibration object placed in a known geometry is required to estimate the matrix Pi which has eleven parameters. In addition, once the camera is panning or zooming (i.e. camera setting is altered), the calibration of cameras should be repeated. As described above, various conventional algorithms for localizing an object have disadvantages due to a tradeoff between the accuracy of localization and the complexity of calculation.

DETAILED DESCRIPTION OF THE INVENTION

Technical Problem

The present invention provides a method of localizing an object by using visual images of reference coordinates, the method capable of improving accuracy and reducing the complexity of calculation.

Technical Solution

According to an aspect of the present invention, there is provided a method of localizing an object, the method including: projecting an object located on an object plane and a reference point corresponding thereto on a virtual viewable plane and an actual camera plane; estimating coordinates of the reference point; and prescribing a relationship between a location of the object and the coordinates of the reference point. Preferably, the virtual viewable plane may be parallel to the object plane. Preferably, the object may be projected by one sensor. On the other hand, the object may be projected by a plurality of sensors. When the object is projected by the plurality of sensors, the method may further include mutually compensating a difference in localization between the object projected by the plurality of sensors and the reference point. In this case, the plurality of sensors may be selected based on a pan factor of each of the plurality of sensors. Preferably, sensors whose difference between absolute values of the pan factors is "0" may be selected as the plurality of sensors. Preferably, in the prescribing a relationship between a location of the object and the coordinates of the reference point, when the location of the object is identical to a location of the reference point, the location of the reference point may be determined as the location of the object. Preferably, the method may be performed one time. On the other hand, the method may be performed iteratively.

ADVANTAGEOUS EFFECTS

There is provided an effective method of localizing an object by using multiple visual images, in which a parallel projection model supporting zooming and panning of imaging devices is used to estimate reference coordinates via rough estimation obtainable from a pre-estimation process, thereby reducing the complexity of calculation and compensating non-linear distortion in such a way that the object is accurately localized.

BEST MODE FOR CARRYING OUT THE INVENTION

Figure 1:
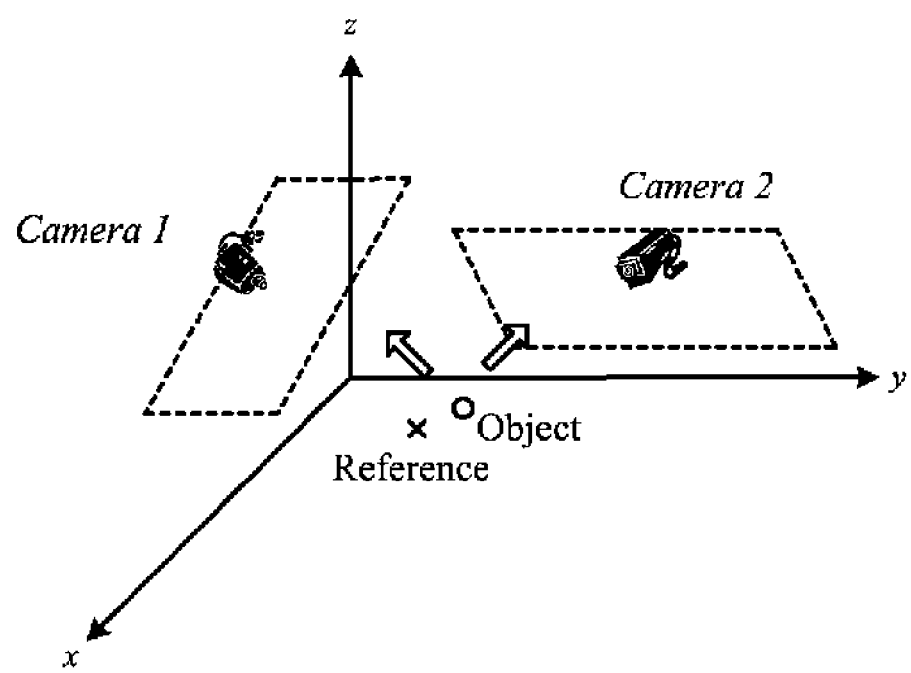
FIG. 1 illustrates the concept of visual localization where two cameras are applied to object localization.

To fully understand advantages of operations of the present invention and the objects obtained by embodiments of the present invention, it is required to refer to attached drawings illustrating preferable embodiments of the present invention and contents shown in the drawings. Hereinafter, the preferable embodiments of the present invention will be described in detail with reference to the attached drawings. The same reference numerals shown in each drawing indicate the same elements.

FIG. 1 illustrates the concept of visual localization where two cameras are applied to object localization. In a parallel projection model, a virtual viewable plane is generated for an aid formulating the relationship between a real object and an actual camera. Our approach has the advantage which localizes multiple objects without calibration. Our proposed algorithm starts with the pre-estimated position which is roughly calculated. In addition, even without the pre-estimation from additional tracking algorithms, the roughly estimated position may be replaced with a sensor node position. Through our proposed method, the final estimated position P(xn, yn) is obtained as:

$$P(x_n, y_n) = E(x_n, y_n) + e(\sigma_{x_n}, \sigma_{y_n}) \quad (1)$$

where E(xn, yn) represents a reference position, and e(σxn, σyn) represents coordinate compensation through the visual localization.

Hereinafter, first, there will be described a parallel projection model with a single camera, and then, there will be described a visual localization algorithm in a 2-dimensional coordinate with multiple cameras. After that, there will be described analysis and simulation results where the localization errors are minimized by compensating for non-linearity of the digital imaging devices.

I. Characteristics of Viewable Images

A. Basic Concept of a Parallel Projection Model

Figure 2:
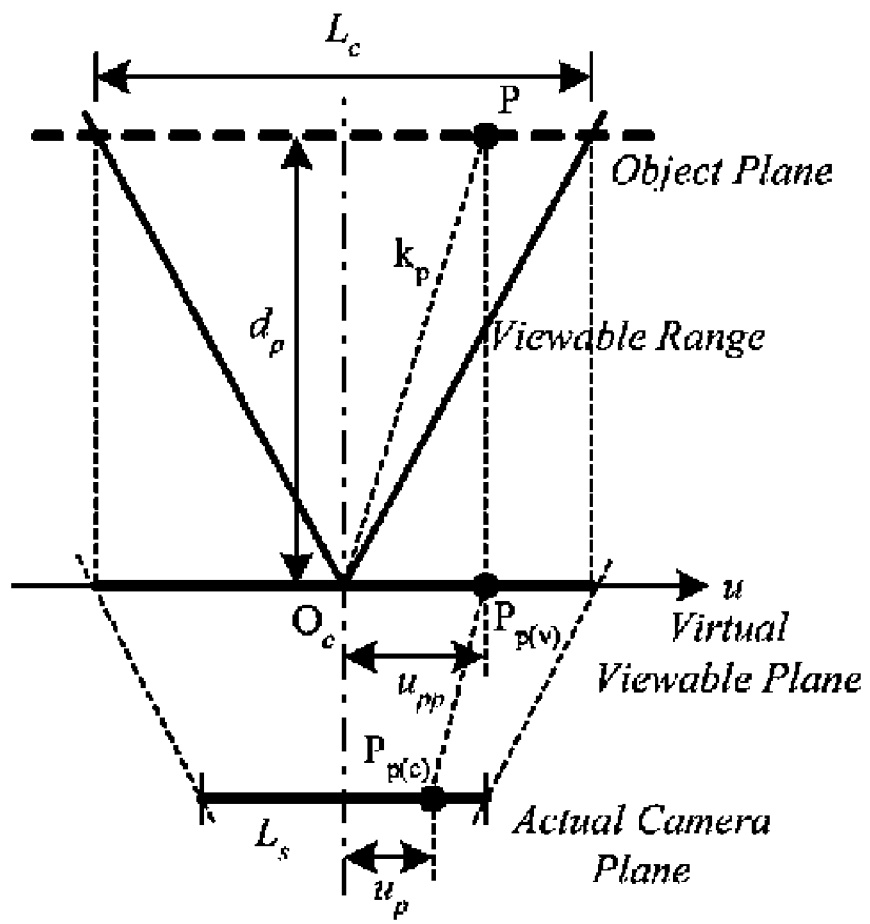
FIG. 2 illustrates a relationship between an actual image projected into a camera and a parallel projection model.

A parallel projection model is used to simplify the visual localization, which is basically comprised of three planes; an object plane, a virtual viewable plane and an actual camera plane. As shown in FIG. 2, an object P is placed on an object plane and projected to both a virtual viewable plane and an actual camera plane where the projected points are denoted as Pp(v) and Pp(c). The virtual viewable plane is parallel to the object plane with distance dp between the virtual viewable plane and the object plane. For simplicity, Lc and Ls denote each length of the virtual viewable plane and the actual camera plane, respectively. Each position of the projected object on the virtual viewable plane and actual camera plane is denoted as upp and up, respectively. In addition, a distance between points P and Oc is denoted as kp. In the parallel projection model, a real object is to projected from an object plane through a virtual viewable plane to an actual camera plane. Hence, as formulated in Equation (2), upp is expressed as Lc, Ls and up through the proportional lines of two planes as follows:

$$u_{pp} = u_p \left( \frac{L_c}{L_s} \right) \quad (2)$$

The real object position is easily obtained from upp and the distance dp between the virtual viewable plane and the object plane.

B. Zooming and Panning

Here, we define zoom factor z and pan factor θp in order to consider the properties of a camera. The zoom factor z is defined as a ratio of dp and Lc as following:

$$z = \frac{d_p}{L_c} \quad (3)$$

Figure 3:
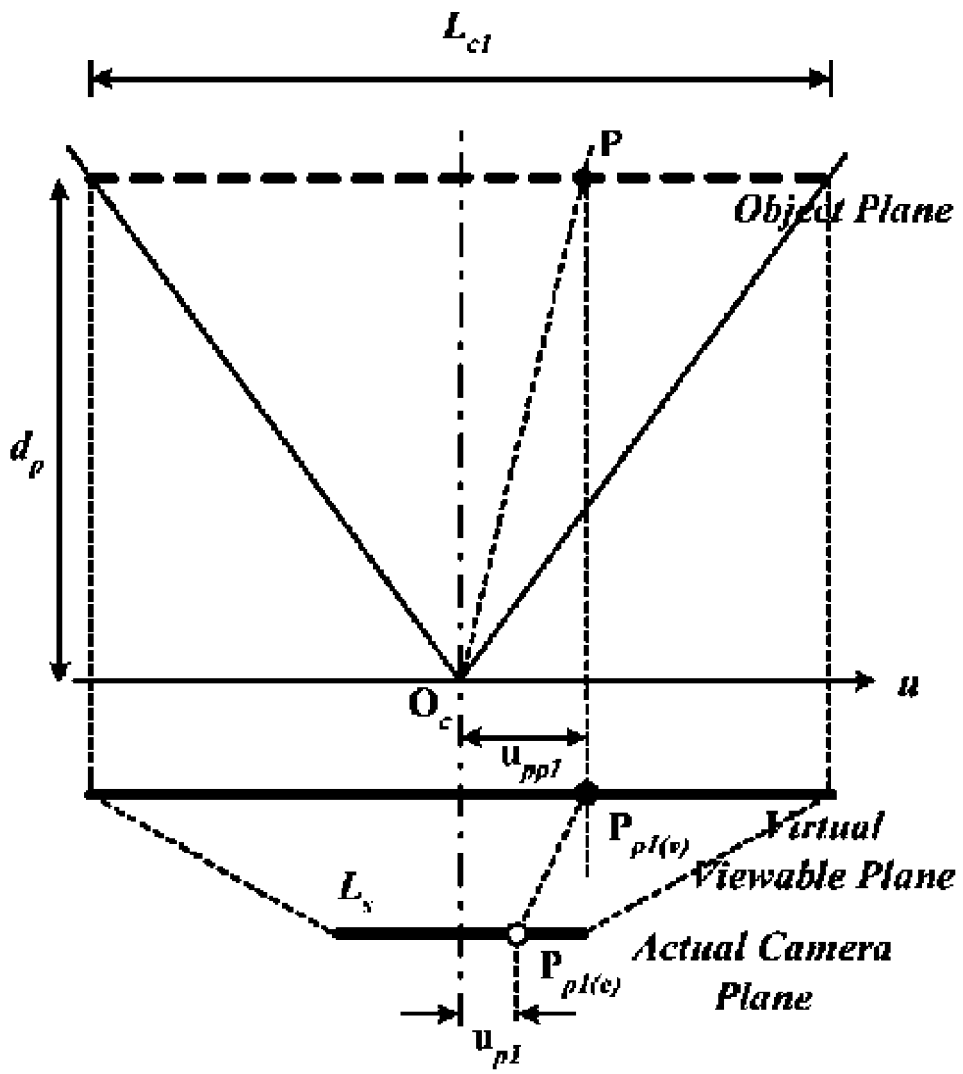
FIG. 3 illustrates the change of the projected position on actual camera plane Pp1(c) and Pp2(c) according to zooming factors z1 and z2.
Figure 3:
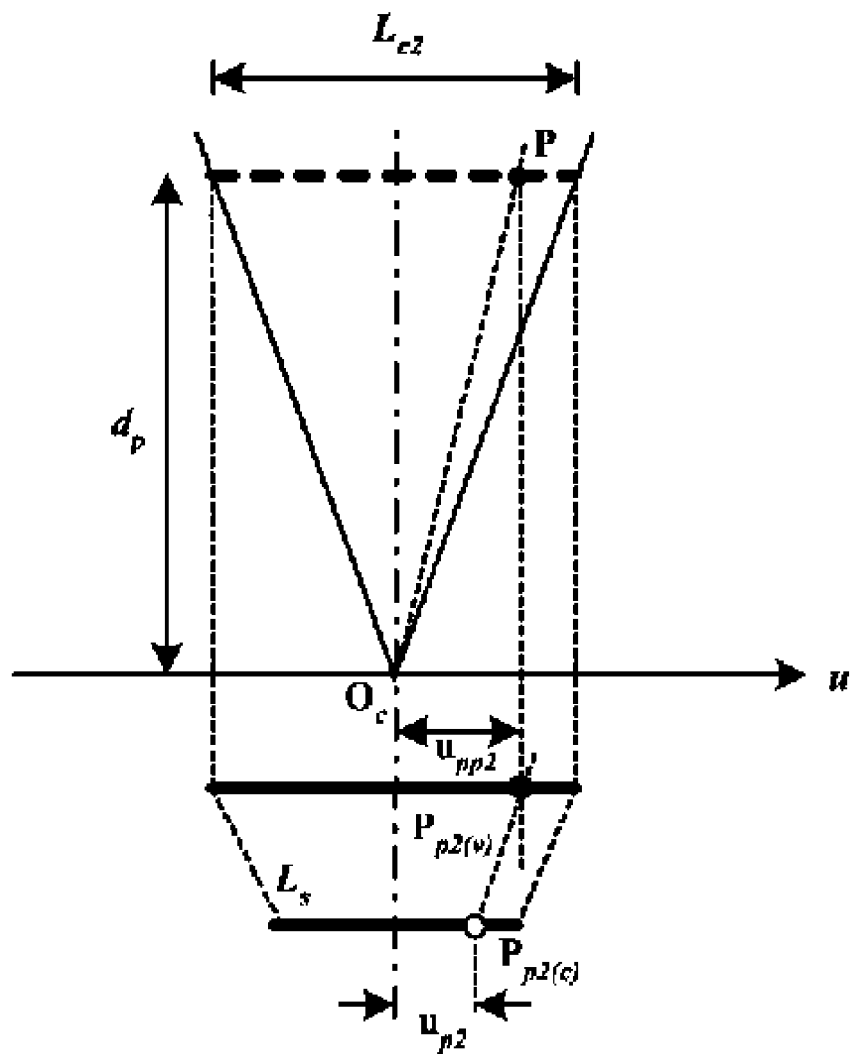

FIG. 3 illustrates the change of the projected position on actual camera plane Pp1(c) and Pp2(c) according to zooming factors z1 and z2. Note that projected positions on virtual viewable plane Pp1(v) and Pp2(v) are constant. Once two cameras have different zooming factors, the object is projected differently on the actual camera plane only. Here, based on the relationship between upp and up in (2), projected positions up1 and up2 on the actual camera plane are expressed as:

$$u_{pp1} = u_{p1}(L_{c1}/L_s) \quad (4)$$

$$u_{pp2} = u_{p2}(L_{c2}/L_s) \quad (5)$$

Since $z_1 = d_p/L_{c1}$ and $z_1 = d_p/L_{c1}$ from (3), the relationship between $u_{p1}$ and $u_{p2}$ is derived as:

$$u_{p1} = u_{p2}\frac{z_2}{z_1} \quad (6)$$

Figure 4:
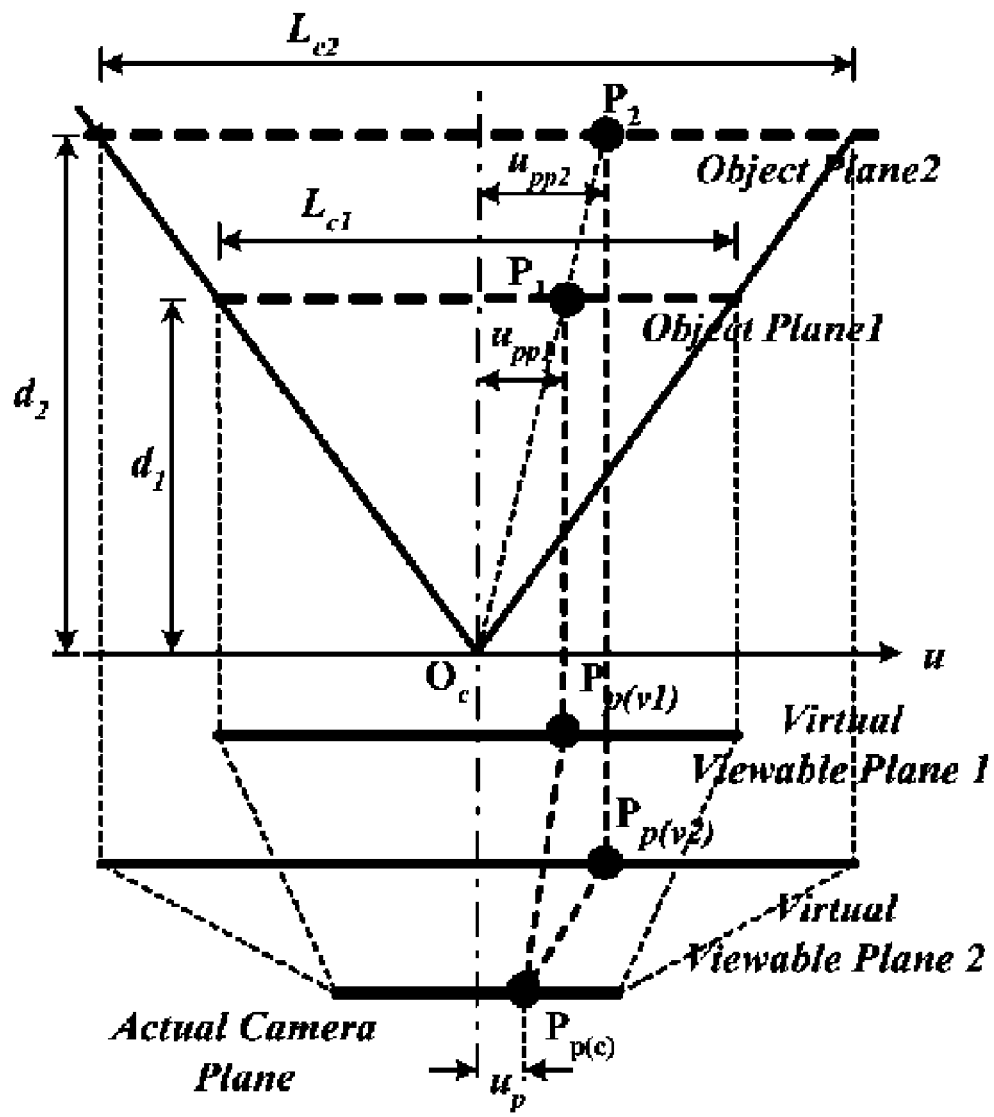
FIG. 4 illustrates a special case in which two different objects are projected to the same spot on the actual camera plane even based on the same zooming.

FIG. 4 illustrates a special case in which two different objects are projected to the same spot on the actual camera plane even based on the same zooming. Then, a virtual viewable plane is changed while an actual camera plane is constant. The virtual viewable plane 1 and 2 are denoted for each object $P_1$ and $P_2$ together with the projected point $P_{p(v1)}$ and $P_{p(v2)}$, respectively. In addition, object plane 1 and 2 are denoted for each object $P_1$ and $P_2$. Since the zoom factor z is same, $$z = d_1/L_{c1} = d_2/L_{c2} \quad (7)$$

and the relationship between upp1 and upp2 is expressed as $$u_{pp1} = u_{pp2}\frac{d_1}{d_2} \quad (8)$$

Figure 5:
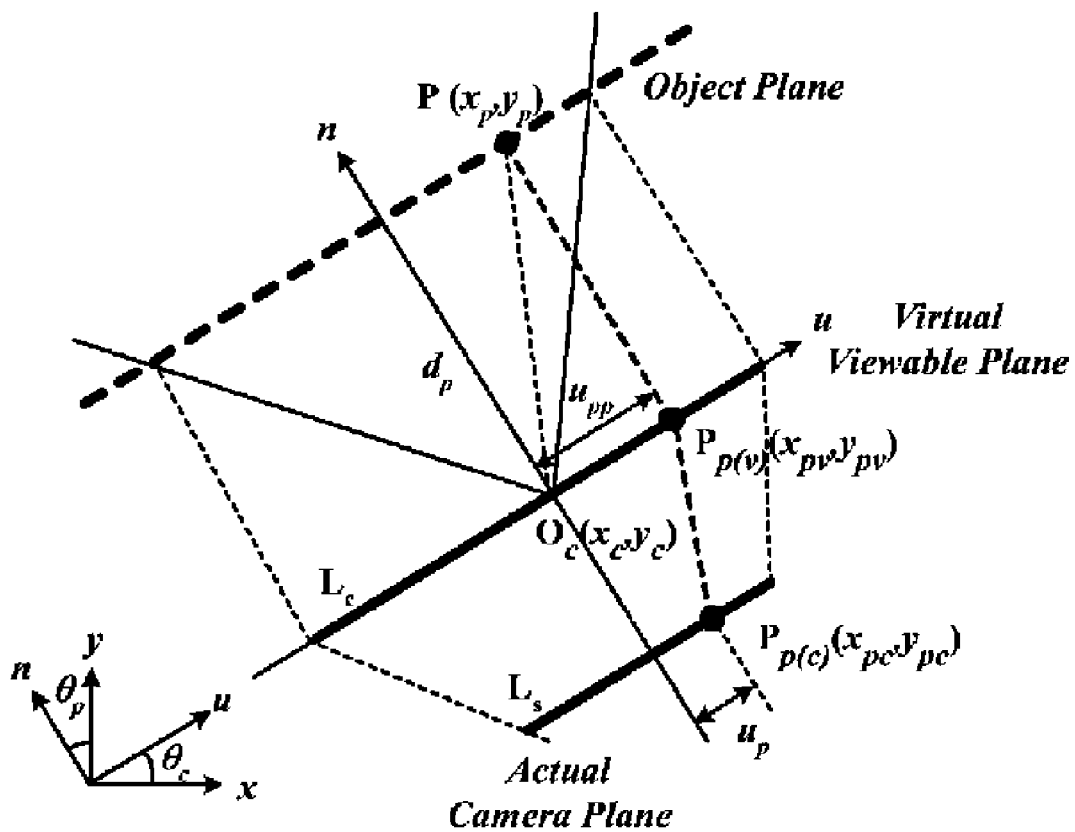
FIG. 5 illustrates the coordinate transformation of various viewable planes due to panning of a camera.

It is shown that the distance in projection direction between an object and a camera is an important parameter for object localization. The formulation of detection of distance using multiple sensors will be described later. There will be described a pan factor denoted as $\theta_p$ representing the angle difference between a projection direction (n-axis) and a global coordinate y-axis as shown in FIG. 5.

Here, the global coordinate is defined as x-y axis fixed coordinate and $\theta_c$ denotes the camera angle. The object projected position on a virtual viewable plane $P_{p(v)}$ is derived as:

$$x_{pv} = x_c + u_{pp} \cos \theta_c$$

$$y_{pv} = y_c + u_{pp} \sin \theta_c \quad (9)$$

where $x_{pv}$ and $y_{pv}$ represent a point of $P_{p(v)}$, $x_c$ and $y_c$ represent a point of the center of a virtual viewable plane $O_c$. Note that $\theta_c$ and $\theta_p$ are equal to zero when an actual camera plane is aligned to the x-axis.

C. Object Localization Based on Single Camera

Figure 6:
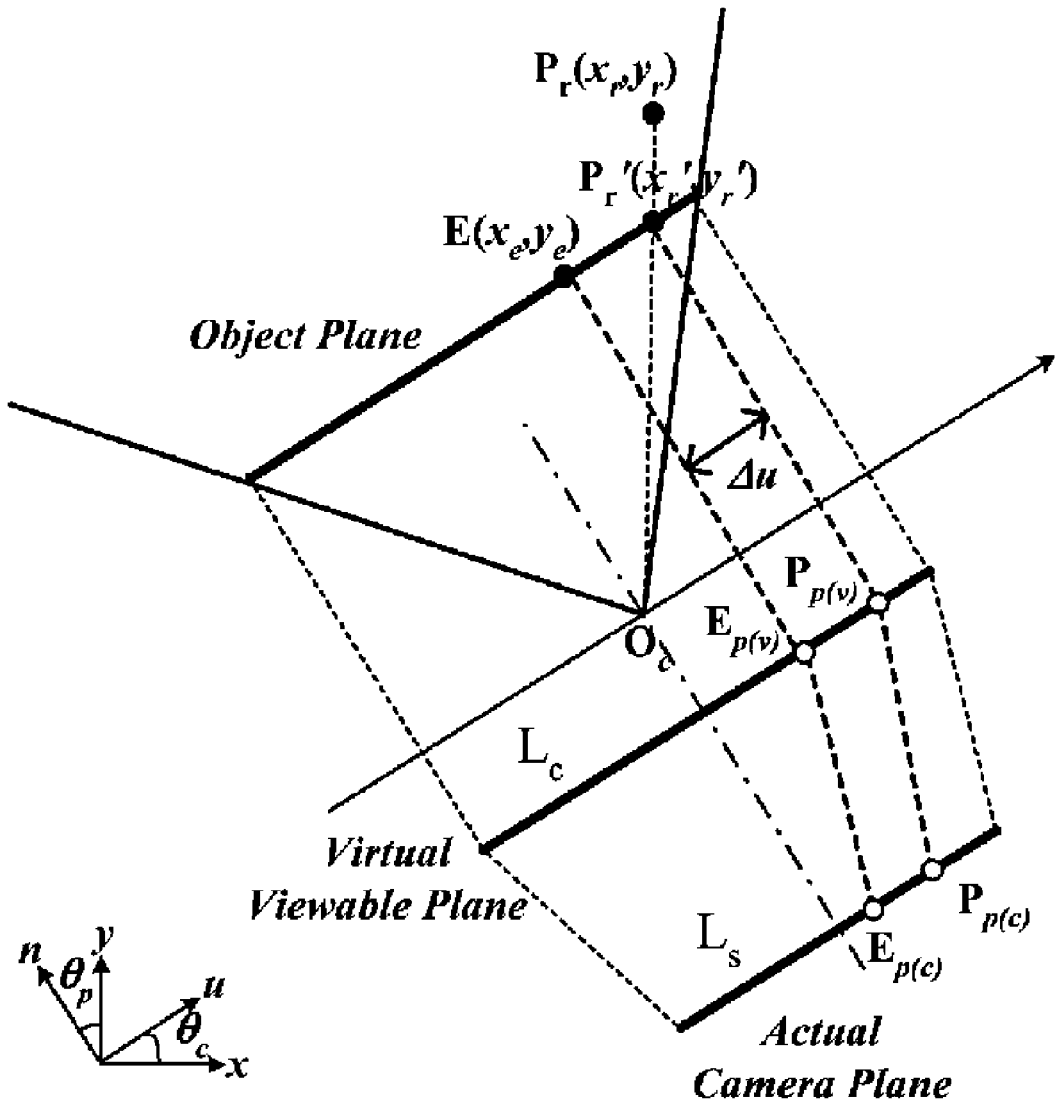
FIG. 6 illustrates the object localization using a reference point E based on a single sensor.

There will be described localization based on a single camera. FIG. 6 illustrates the object localization using a reference point E based on a single sensor. A reference point E and a real object $P_r$ are projected to two planes; the virtual viewable plane and the actual camera plane. Here, since the reference point E generates an object plane, a real object $P_r$ is distorted to the point $P_{r'}$ which is aligned with the object plane. In view of the projected positions, the distance between $E_{p(v)}$ and $P_{p(v)}$ is obtained from (2) with the distance between $E_{p(c)}$ and $P_{p(c)}$. Finally, the approximated object point $P_{r'}(x_{r'}, y_{r'})$ aligned with an object plane is determined as:

$$x'_r = x_e + \Delta u \cos \theta_p$$

$$y'_r = y_e + \Delta u \sin \theta_p \quad (10)$$

Through the single sensor based visual projection method, it is shown that an approximated localization is accomplished with a reference point. Next, there will be described localization using multiple sensors to reduce the error between Pr and P r'.

II. Visual Localization Algorithm in 2-Dimensional Coordinate

A. Relationship Between Camera Positions and Pan Factors

Figure 7:
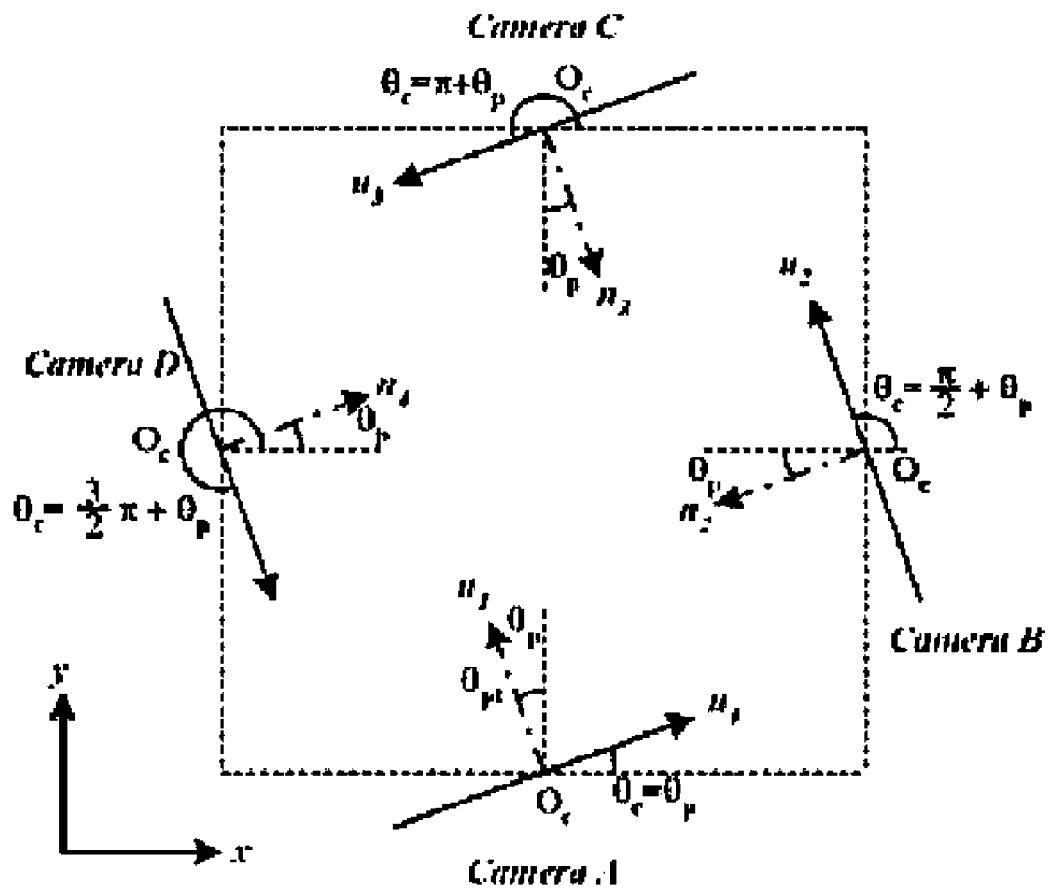
FIG. 7 illustrates multiple cameras with pan factors and camera angles.
Figure 8:
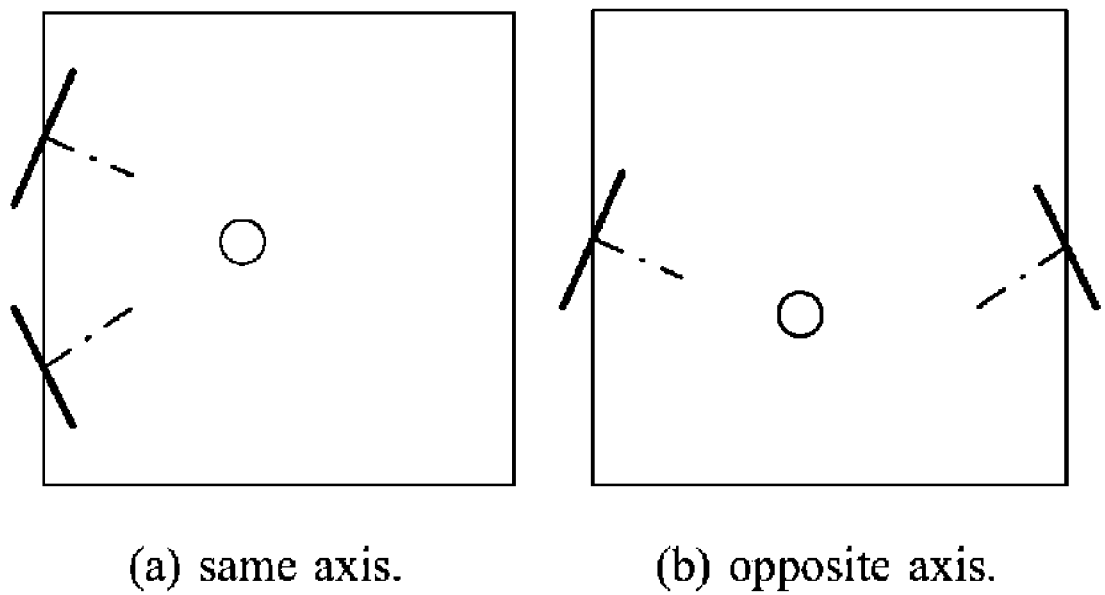
FIG. 8 illustrates two cameras on the same axis and two cameras on opposite axes from each other.

FIG. 7 illustrates the multiple cameras with pan factors and camera angles. Among deployment of four possible cameras, such as Cameras A, B, C, D, a pair of cameras located in adjacent axes are chosen. The camera angle θc represents the camera view angle relative to the global x-axis while the pan angle θp represents the angle of direction ni relative to the global coordinate as shown in FIG. 7(a). The sign of θp is determined; right rotation is positive and left rotation is negative. For this discussion, the camera on the left is designated as Camera 1 and the camera on the right as Camera 2. For the localization formulation with two cameras in adjacent axes, Camera D, and A are assumed to view an object. Here, the signs of pan factors θp1 and θp2 are changed depending on an object's position because the viewable angle from a camera is restricted below 180°. Before addressing localization with the two cameras placed in adjacent axes, we briefly present the other possible placements. The other placements are not necessarily under a ban. The two cameras in the same axis or opposite axis shown in FIG. 8 can be explained in the same formulation with FIG. 7(b) through 7(e). In particular, 8(a) is equivalent to 7(e), and 8(b) is equivalent to 7(d). The only difference is the viewable range obtained from the two cameras.

B. Object Localization Based on Multiple Cameras

Based on the two cameras selected, we investigate and formulate an object localization in two cases; special and general. The special case is localizing an object without considering pan factors; θp1 and θp2 are zero.

Figure 9:
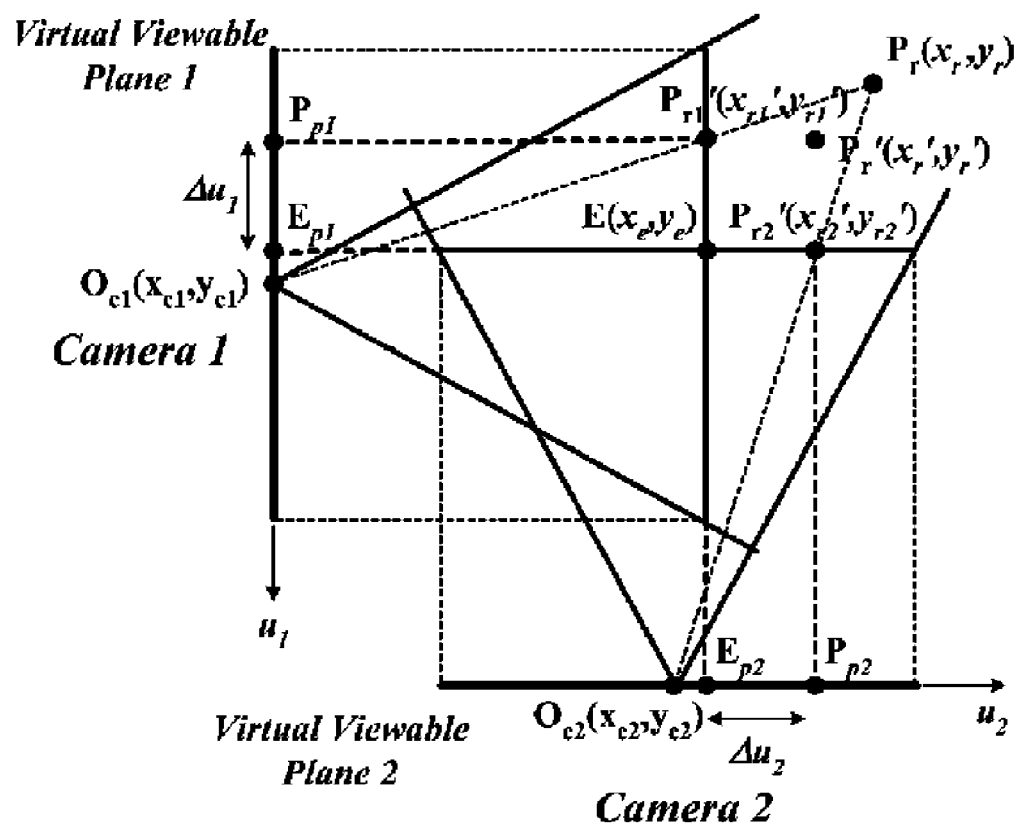
FIG. 9 illustrates a localization method using two cameras in a special case without considering pan factors θp1 and θp2 are zero.

FIG. 9 illustrates the localization using two cameras with pan factors of zero. Given by a reference point E(xe, ye), the object planes for two cameras are determined. The points P'r1(x'r1, y'r1) and P'r2(x'r2, y'r2) on each camera object plane are projected perpendicularly to the points Pp1 and Pp2 on each virtual viewable plane, respectively. Similarly, the reference point E(xe, ye) is projected to the points Ep1 and Ep2. In view of Camera 1, the distance Δu1 between the projected points Pp1 and Ep1 supports a distance between the object plane of Camera 2 and the point P'r. Similarly, in the view of Camera 2, the distance Δu2 between the projected points Pp2 and Ep2 supports a distance between the object plane of Camera 2 and the point P'r. In other words, the basic compensation algorithm is that Camera 1 compensates y direction by Δu1 and Camera 2 compensates x direction by Δu1 given by a reference point E. Through one additional sensor, both Δu1 in y direction and Δu2 in x direction compensate a reference point closer to a real object position as:

$$x'_r = x_e + \Delta u_2$$

$$y'_r = y_e + \Delta u_1 \quad (11)$$

where P'r(x'r, y'r) is the localized object position through the two cameras which still results in an error with the real object position Pr(xr, yr). Note that the closer E is given to a real point of an object, the closer P'r is determined to Pr. In other words, the error can be reduced by obtaining a reference point E closer to a real position Pr of an object. In Section III-D, an iterative approach is introduced for improving localization.

Figure 10:
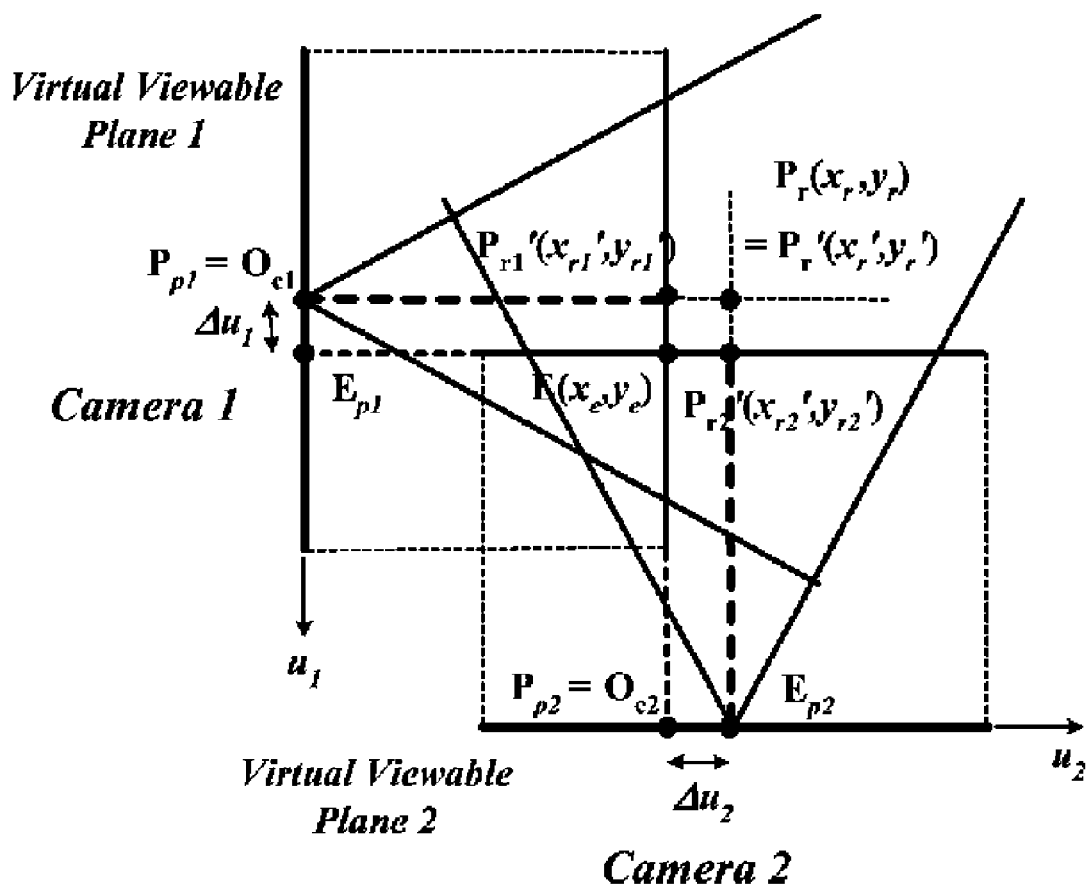
FIG. 10 illustrates an ideal case of FIG. 9, that is, a real object viewed at the center point of cameras resulting in an exact position determination.

The other strategy for accurate localization is to project a real object to a virtual viewable plane without any distortion. As shown in FIG. 10, the real object position Pr is aligned to the center of each camera resulting in the points Pr and P'r matching exactly. This means that the localization error is reduced to zero no matter where the reference point E is. Thus, we need to consider how the real object is viewed at the center point of a camera. This case will be generally formulated in General case. In the above, real inputs are projected points on actual camera planes. For less complicated illustrations, the actual camera plane is omitted. The transformation from an actual camera plane to a virtual viewable plane is simply obtained in Equation (2).

Figure 11:
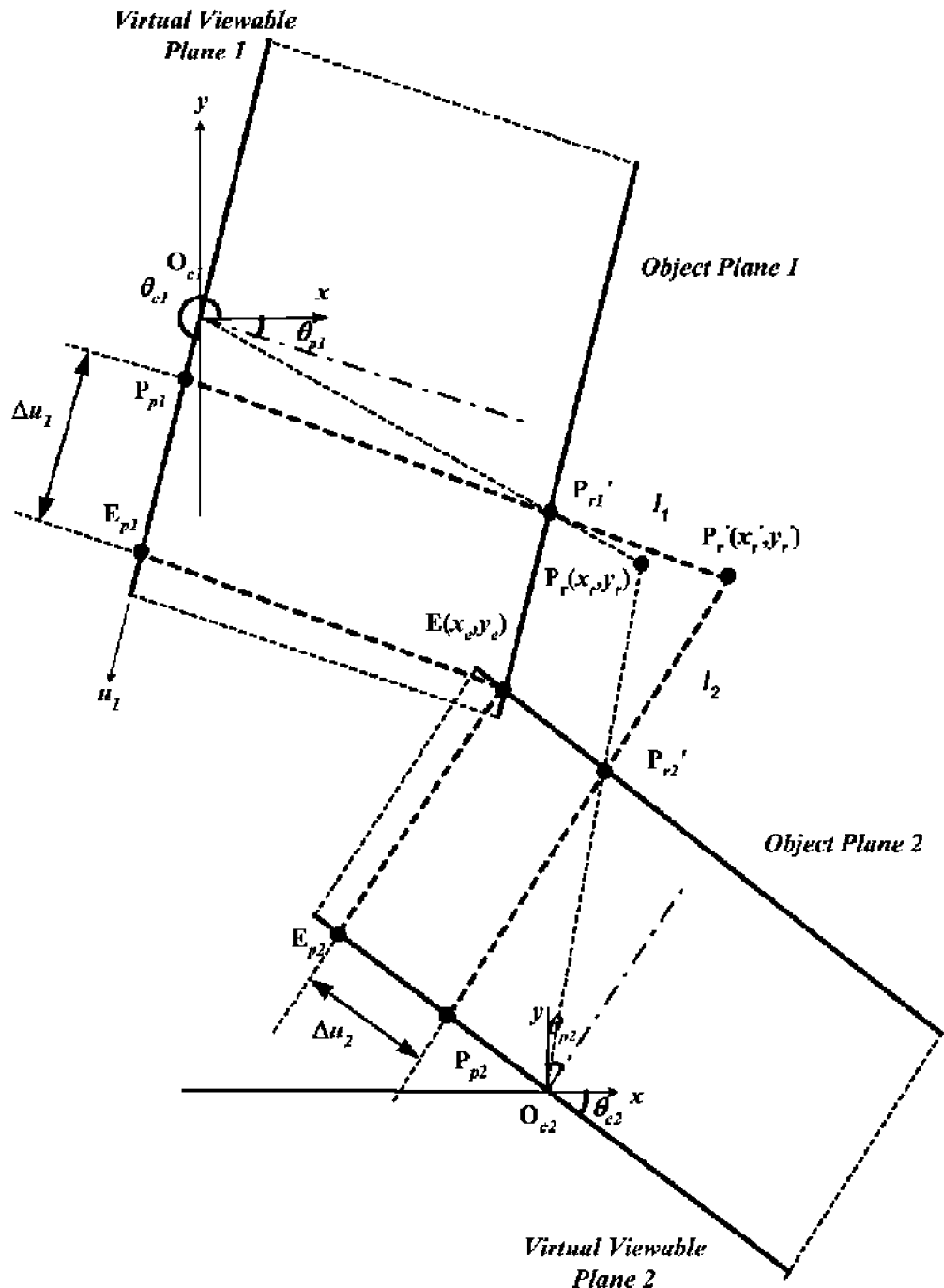
FIG. 11 illustrates a general case where two cameras are rotated when pan factors θp1 and θp2 are not "0"

Another general case where p1 and/or p2≠0 is based below. As an object is moving in a space, cameras may be required to control the pan factor in order to overcome the limited viewable range. Here, we formulate general multiple sensor localizations including the Special case. FIG. 11 shows that two cameras are rotated to view an object of which θp1 and θp2 are nonzero. Including the projection to virtual viewable planes and actual camera planes, the localization method is the same as the Special Case. However, the products Δu1 and Δu2 are skewed depending on each pan factor θp1 and θp2. Note that the quadrangle connected four points P'r, P'r1, P'r2 and E are skewed as well, while the Special Case constitutes a rectangle or a square requiring simple calculations with addition and/or subtraction. The two skewed cameras with pan factors θp1 and θp2, Δu1 and Δu2, compensate the reference in an analytical solution as follows:

$$l_1: y = \tan(\theta_1)x + y'_{r1} - \tan(\theta_1)x'_{r1}$$

$$l_2: y = \tan(\theta_2)x + y'_{r2} - \tan(\theta_2)x'_{r2} \quad (12)$$

where the localized position P'r(x'r, y'r) is a cross point of the two virtual projected lines; a line l1: P'r1(x'r1, y'r1) to P'r(x'r, y'r), and a line l2: P'r2(x'r2, y'r2) to P'r(x'r, y'r). θ1 and θ2 are the projection line slopes of each camera equal to −θp1 and 90−θp2, respectively. P'r1 and P'r2 are derived as:

$$x'_{r1} = \Delta u_1 \cos\theta_{c1} + x_e, \quad y'_{r1} = \Delta u_1 \sin\theta_{c1} + y_e \quad (13)$$

$$x'_{r2} = \Delta u_2 \cos\theta_{c2} + x_e, \quad y'_{r2} = \Delta u_2 \sin\theta_{c2} + y_e$$

$$x'_r = \frac{x'_{r1}\tan\theta_1 - x'_{r2}\tan\theta_2 - y'_{r1} + y'_{r2}}{\tan\theta_1 - \tan\theta_2}$$

$$y'_r = \frac{(y'_{r2} - x'_{r2}\tan\theta_2)\tan\theta_1 - (y'_{r1} - x'_{r1}\tan\theta_1)\tan\theta_2}{\tan\theta_1 - \tan\theta_2}$$

In order to validate the localized position P'r(x'r, y'r), the following conditions should be satisfied (i) θ1 and θ2 are neither 90° nor 270°, (ii) tan θ1−tan θ2 should be nonzero.

Since it is unnecessary for cameras to rotate to 90° in practice, the first condition is sufficiently satisfied by choosing cameras. The second condition is restated that θp2−θp1≠90° where θp1=−θ1 and θp2=90−θ2. The two pan factors θp2−θp1=90° results in not only the two parallel object planes but also parallel projection lines of l1 and l2. Thus, the cross point P'r cannot be obtained for the object localization. Furthermore, it is inferred that P'r is localized with a larger error than with the real position Pr as θp2−θp1 is close to 90°.

Turning now to the cameras selection, the pan factor's condition is generally described as:

$$|\theta_{p1}| - |\theta_{p2}| \neq 90° \quad (14)$$

and the best condition is described as:

$$|\theta_{p1}| - |\theta_{p2}| = 0° \quad (15)$$

Thus, cameras selection is assigned by the pair where $|\theta_{p1}| - |\theta_{p2}|$ is the closest to zero. Needless to say, the viewable angles are considered to view an object properly.

C. Discussion

Figure 12:
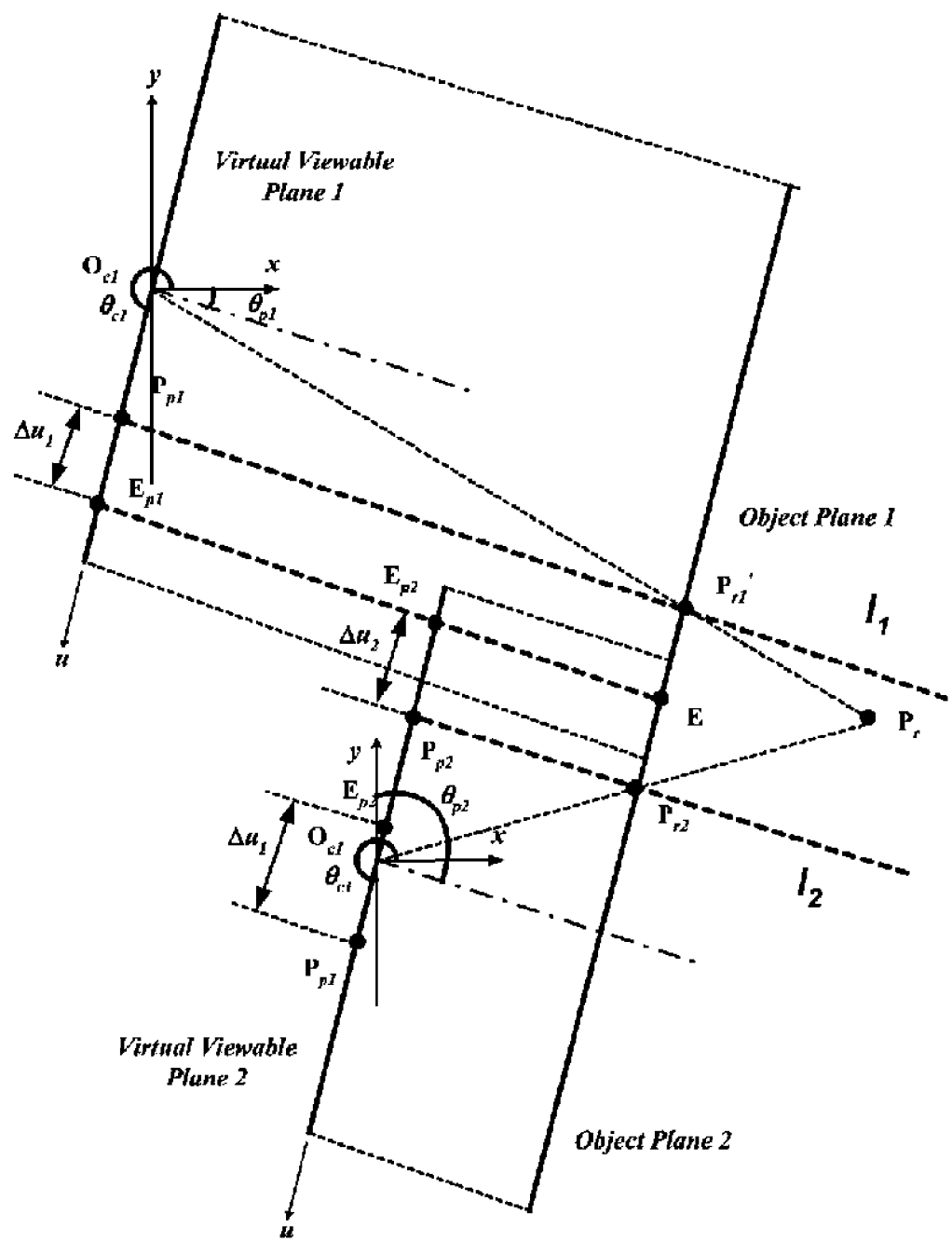
FIG. 12 illustrates two cameras having parallel views to each other, forming two parallel object planes.

Reference Point: Basically, the parallel projection model localizes an object with a reference point which is given by any estimation algorithm such as a Particle Filter or a Kalman Filter. Here, in the parallel projection model localization, an object position and pan factors are key roles. In particular, for more accurate localization, the difference between the points $P_r$ and $P_{r'}$ needs to be reduced. As an ideal method, exact alignment of lines $l_1$ with $P_{r'1} - P_{r'}$, and $l_2$ with $P_{r'2} - P_{r'}$ results in zero error; not only when the two points $P_{p1}$ and $O_{c1}$ are matched, but also when the two points $P_{p2}$ and $O_{c2}$ are matched, then $P_{r'}$ is localized closer to $P_r$. In FIG. 12, the camera center forward lines $F_1$ and $F_2$ are aligned with lines $l_1$ and $l_2$, respectively. However, the condition should be accompanied with a known position of an object. Thus, the best case is to align both $O_{c1}$-E with $l_1$ and $O_{c2}$-E with $l_2$. The condition is involved in the cameras selection as well. Now, what if the reference point E is unknown? If a reference point is not given or any information of approximated object position is not supported, we select the reference point as any random point. In this case, through the iterative approach, the randomly assigned point is becoming closer to $P_r$. Besides, the iterative method improves the accuracy of determining a position even with the known reference point.

D. Iterative Method for Error Minimization

Figure 13:
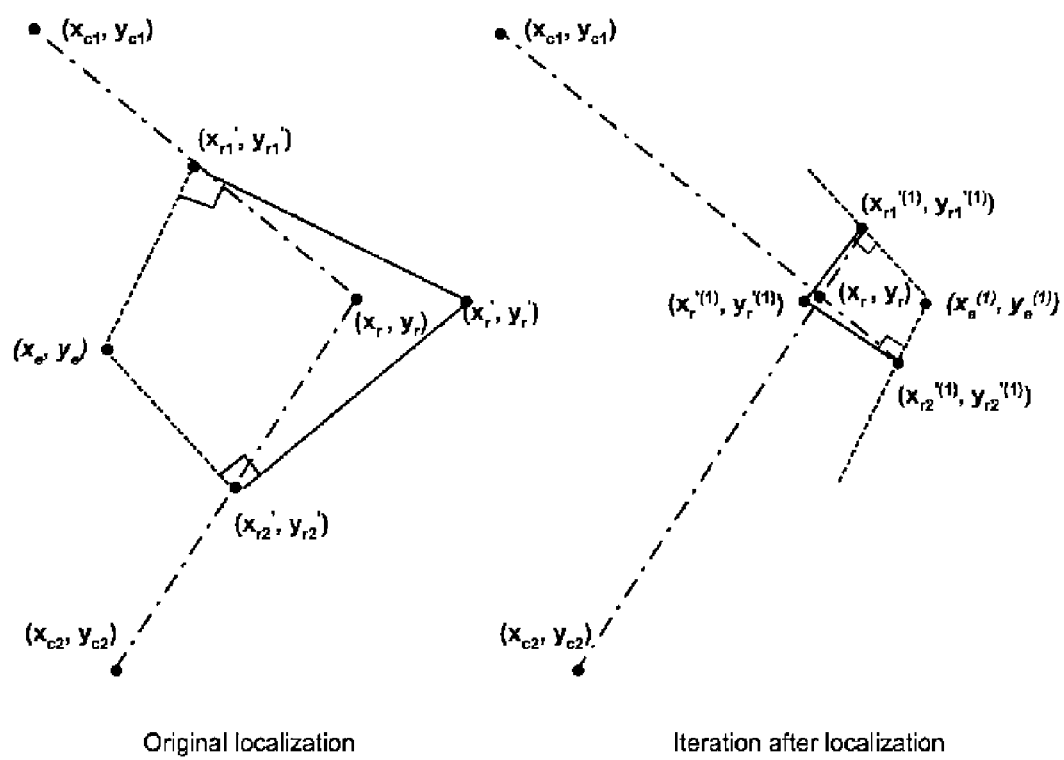
FIG. 13 illustrates original localization and iteration process.
Figure 14:
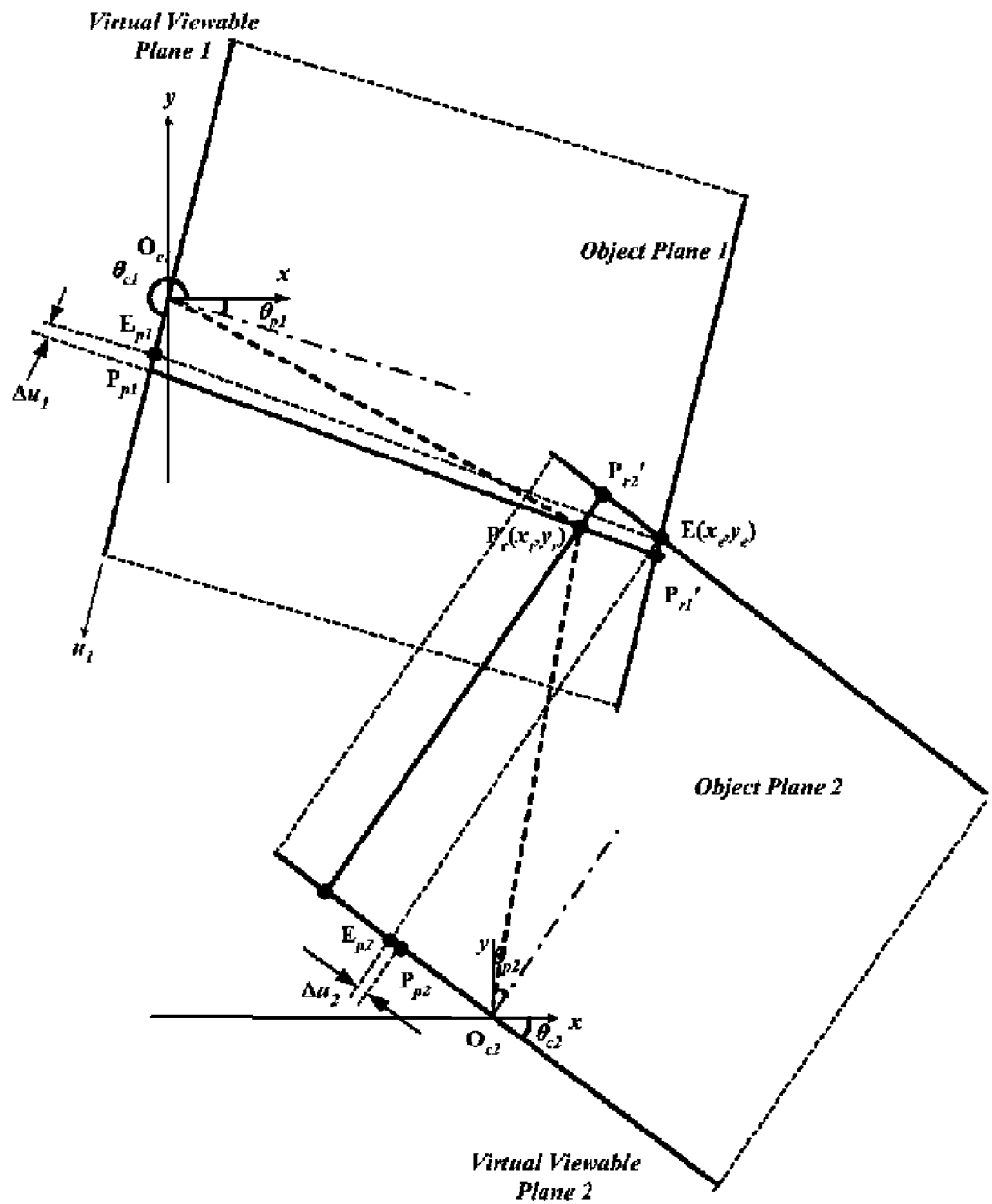
FIG. 14 illustrates a result of one time of iteration based on the case of FIG. 11.

The basic concept is to use the localized position P'r as a reference point E for the next iteration. In this approach, it is not necessary to provide a reference for each object point. In addition, the localized position P'r is getting closer to a real position Pr as the reference point E is closer to a real position Pr. FIG. 13 illustrates the original localization and iteration result. The solid lines are projection lines, the dot lines are object planes, and the combined dot-solid lines are camera view lines. Note that comparing the original and iteration localization, camera view lines are constant while the other lines are moved for the iteration process. The upper right (i) of each position represents the ith iteration time. In the iteration process, the new reference point (xe(1), ye(1)) replaces the previous localized point (x'r, y'r). FIG. 14 shows the iteration result which executes one time of iteration based on FIG. 11. It is shown that P'r is closer to Pr as the iteration process is executed over and over again. The iteration continues until the difference between P'r(i−1) and P'r(i) is smaller than threshold value δ where i is the number of iteration times and P'r(0) is equal to P'r which is the originally obtained position. Furthermore, through the iteration process, the localization is becoming insensitive to the non-linear properties. Hereinafter, there will be described the non-ideal properties and investigate how the iteration method effects the compensation of non-linear properties.

E. Compensation of Lens Non-Linear Distortion

Figure 15:
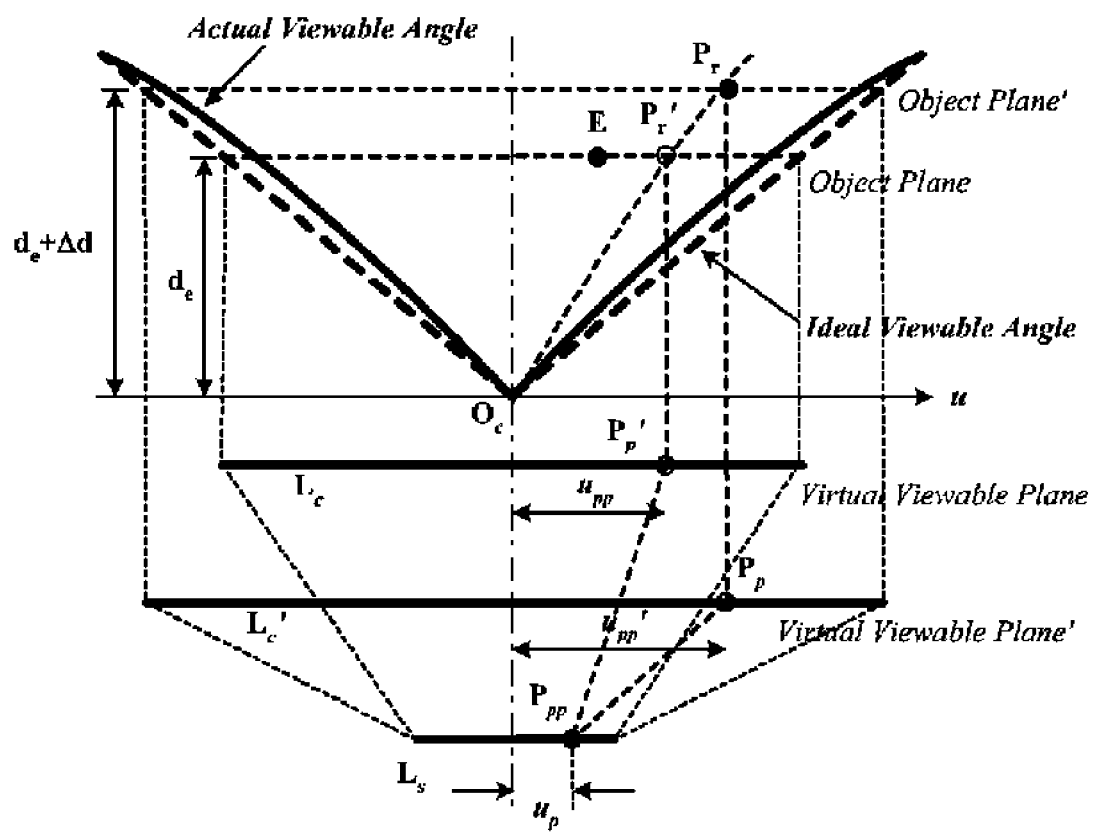
FIG. 15 illustrates the zooming model needed in localization where the dashed line and the solid line indicate an ideal viewable angle and an actual viewable angle with zoom factors z=de/Lc and z'=(de+Δd)L'c.

In practice, a camera lens has non-linear viewable lines instead of straight lines. FIG. 15 illustrates the zooming model needed in localization where the dashed line and the solid line indicate an ideal viewable angle and an actual viewable angle with zoom factors $z = d_e/L_c$ and $z' = d_e + \Delta d/L'_c$, respectively. If a camera has an ideal zooming angle, the zoom factor z is constant, which means z is independent of the reference point E. However, the actual camera has lens distortion. The errors caused by zooming effect and lens distortion are the reason of scale distortion. Due to the zooming factors, $u_{pp}$ is expressed as $u_p(L'_c/L_s)$ by revising the Equation (2). In addition, based on the Equation (3), $L_c$ and $L'_c$ are derived as $d_e/z$ and $d_e + \Delta d/z'$, respectively. Thus, the actual distance ($u_{pp}$) in the actual zooming model is compensated as follows:

$$u'_{pp} = u_{pp}\left(\frac{d_e + \Delta d}{d_e}\right)\left(\frac{z}{z'}\right) \quad (16)$$

While non-linearity of lens property due to the lens distortion can be compensated, it still has fundamental errors. Here, through the iteration process, the error is minimized as the reference point E is close to an object position $P_r$.

Figure 16:
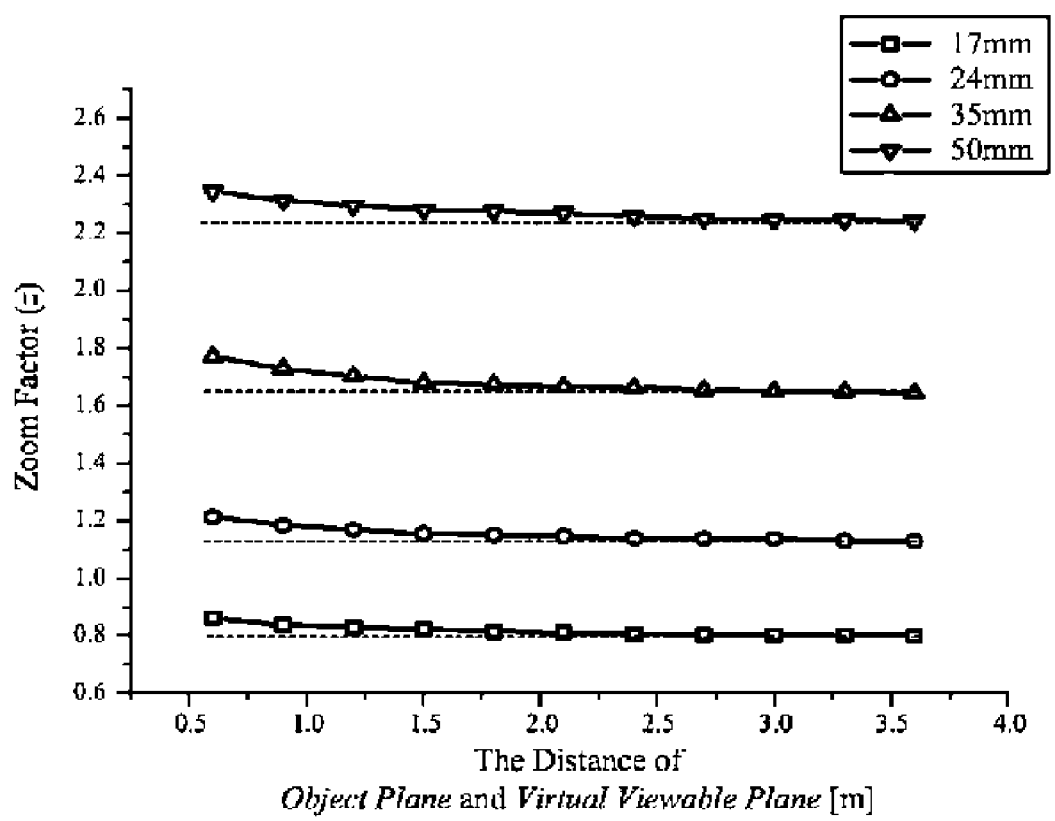
FIG. 16 illustrates zooming distortion having functions of distances from cameras and various actual zoom factors.

FIG. 16 illustrates zooming distortion having functions of distances from cameras and various actual zoom factors. In the above, the configuration and function of the present invention have been described. Hereinafter, the present invention will be analyzed and a simulation result of thereof.

III. Analysis and Simulation

A. Simulation

Figure 17:
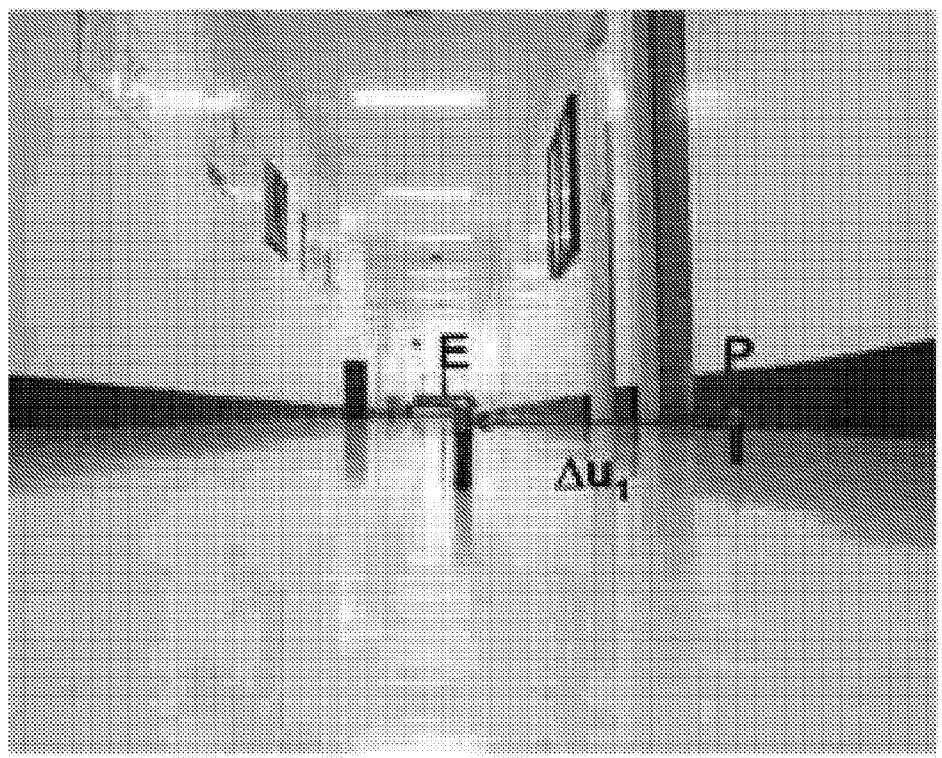
FIG. 17 shows displayed images in two cameras where Δu1 and Δu2 are distances between a reference point (E) and a real object point P in Camera 1 and Camera 2, respectively.
Figure 17:
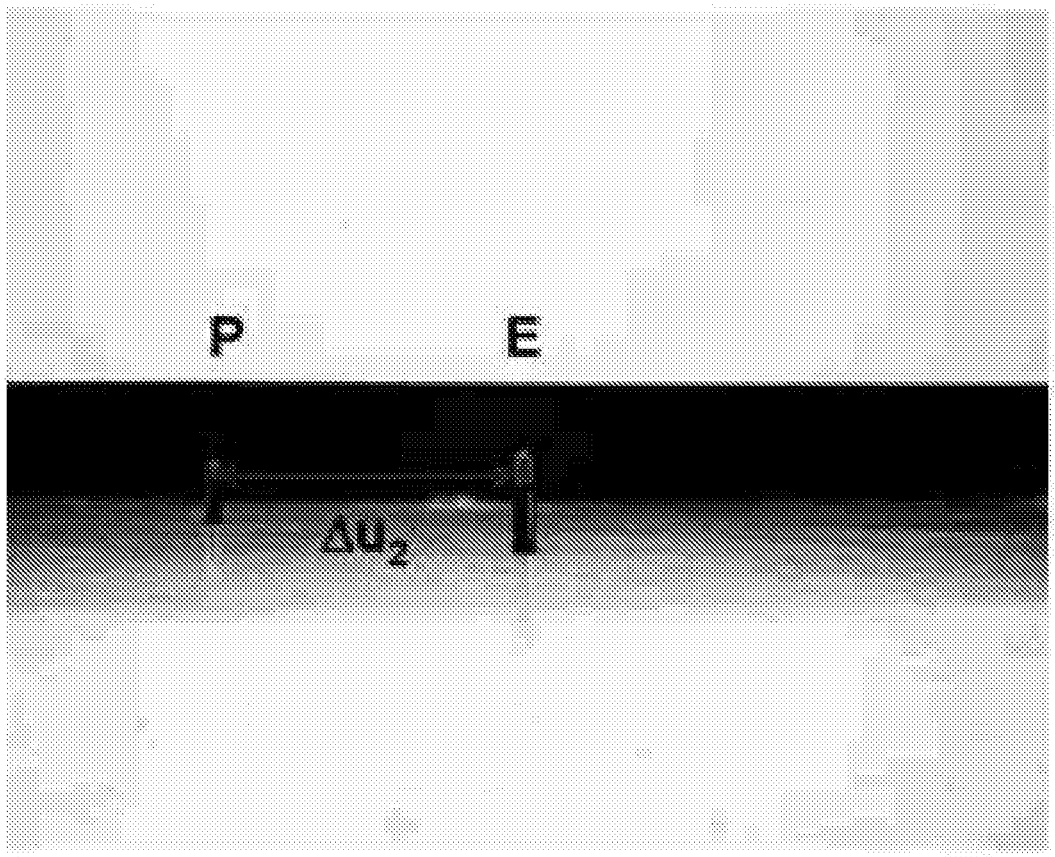
Figure 18:
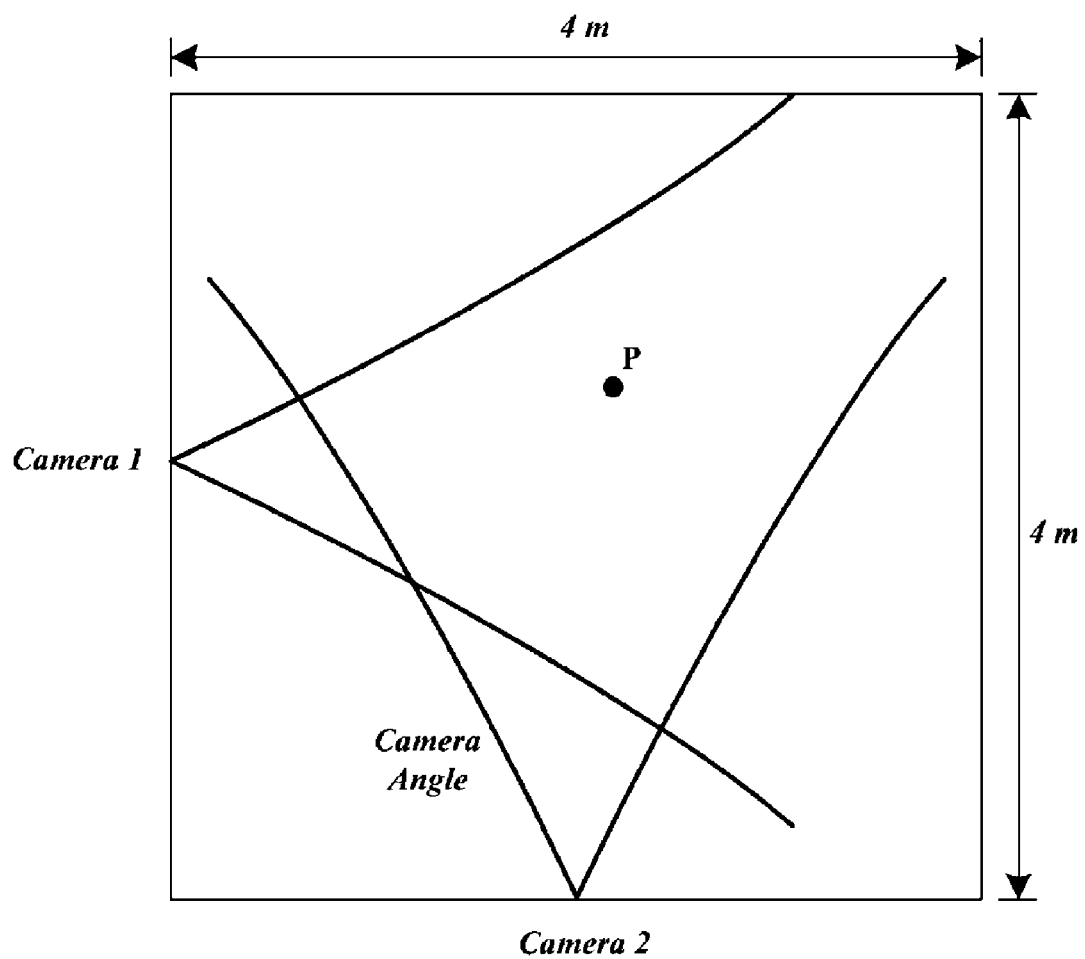
FIG. 18 illustrates the setup of experiment to measure an actual object.

FIG. 17 shows the displayed images in two cameras where $\Delta u1$ and $\Delta u2$ are distances between a reference point (E) and a real object point P in Camera 1 and Camera 2, respectively. For simplicity, we show the reference point E in the image frame shown in FIG. 17(a) and (b); in actual camera operation, the reference point is not displayed. FIG. 18 shows the setup of experiment to measure an actual object. In this experiment, the actual position of the object is calculated from the reference based on the parallel projection model. In FIG. 18, two cameras are placed on the left side for Camera 1 and the bottom side for Camera 2 in Cartesian coordinates. Each camera pan factor $\theta p1$ and $\theta p2$ are both zero. The actual zoom factors are $z1=de1/Lc1$ and $z2=de2/Lc2$ where $z'1$ is the zoom factor when the distance between the object plane and the virtual viewable plane is $de1+\Delta d1$ and $z'2$ is the zoom factor when the distance between the object plane and the virtual viewable plane is $de2+\Delta d2$.

B. Localization Error Evaluation

Figure 19:
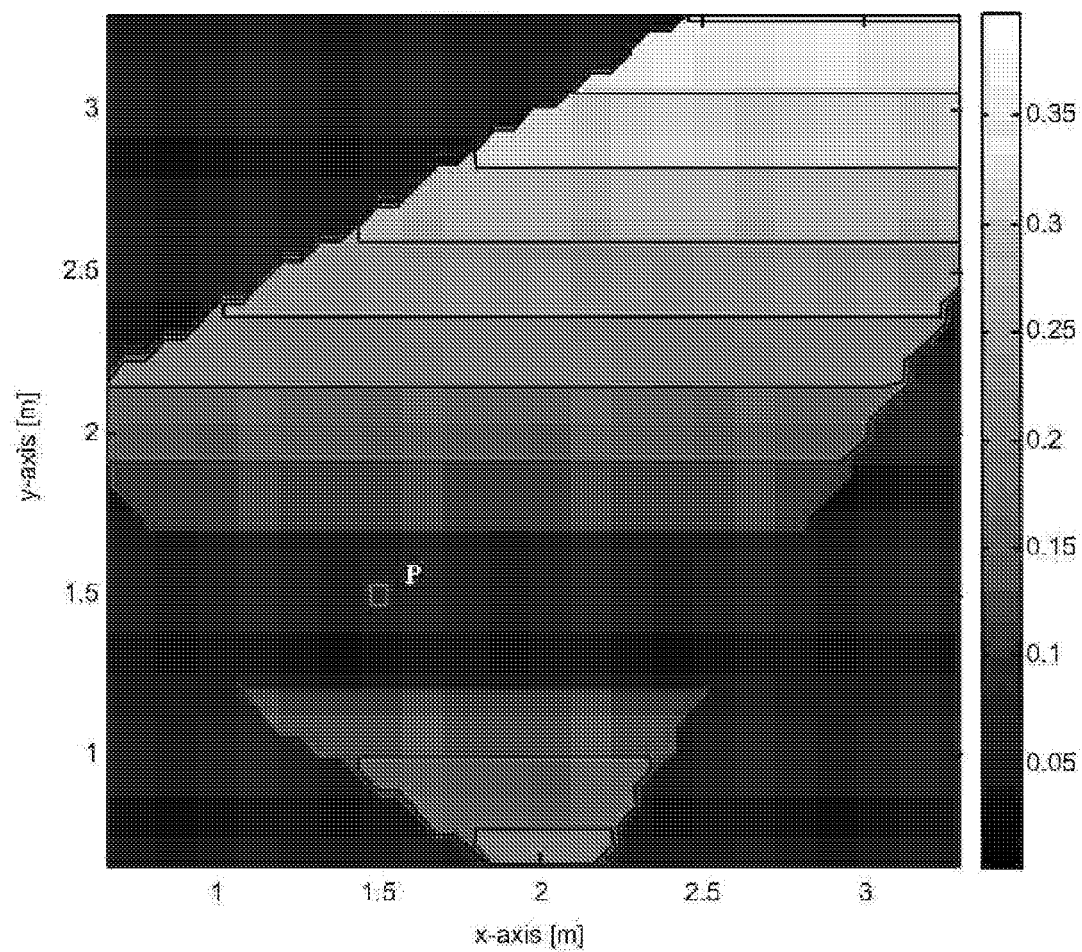
FIG. 19 illustrates the error distribution without the compensation algorithm where two cameras are positioned at Oc1(1.8, 0) and Oc2(0, 1.8)
Figure 19:
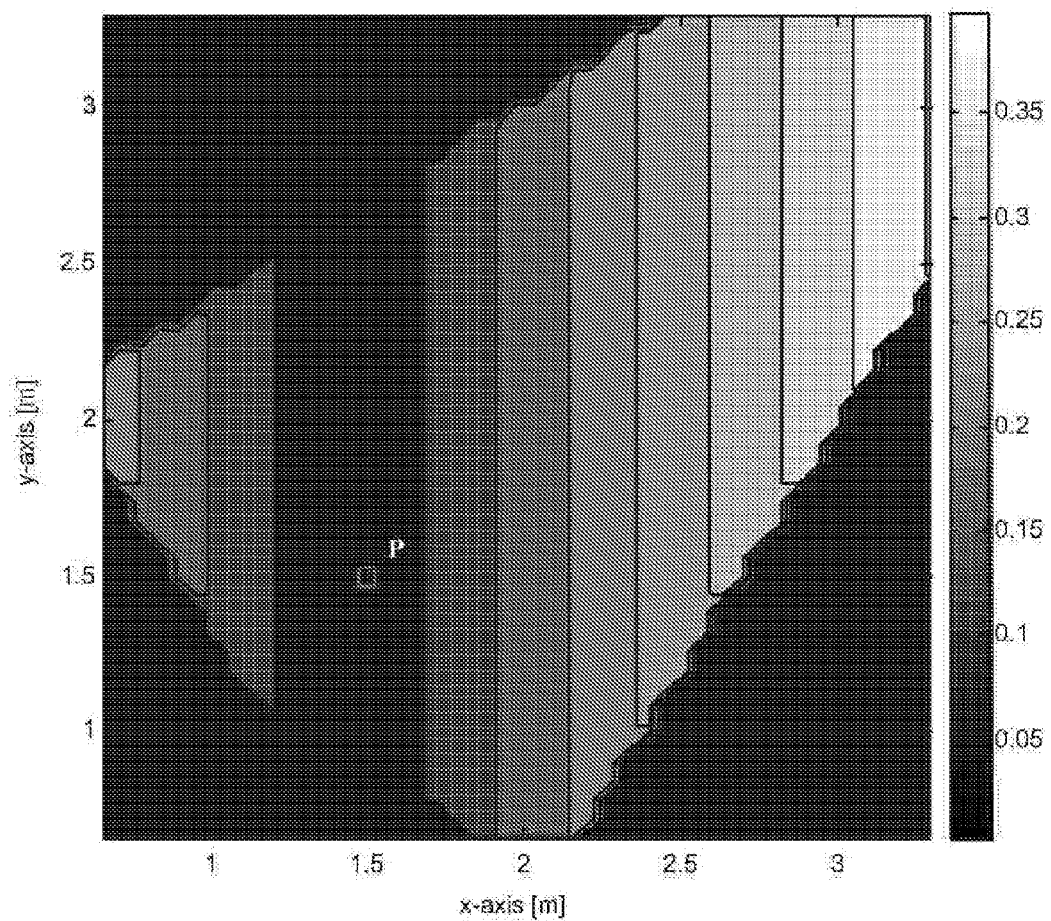
Figure 19:
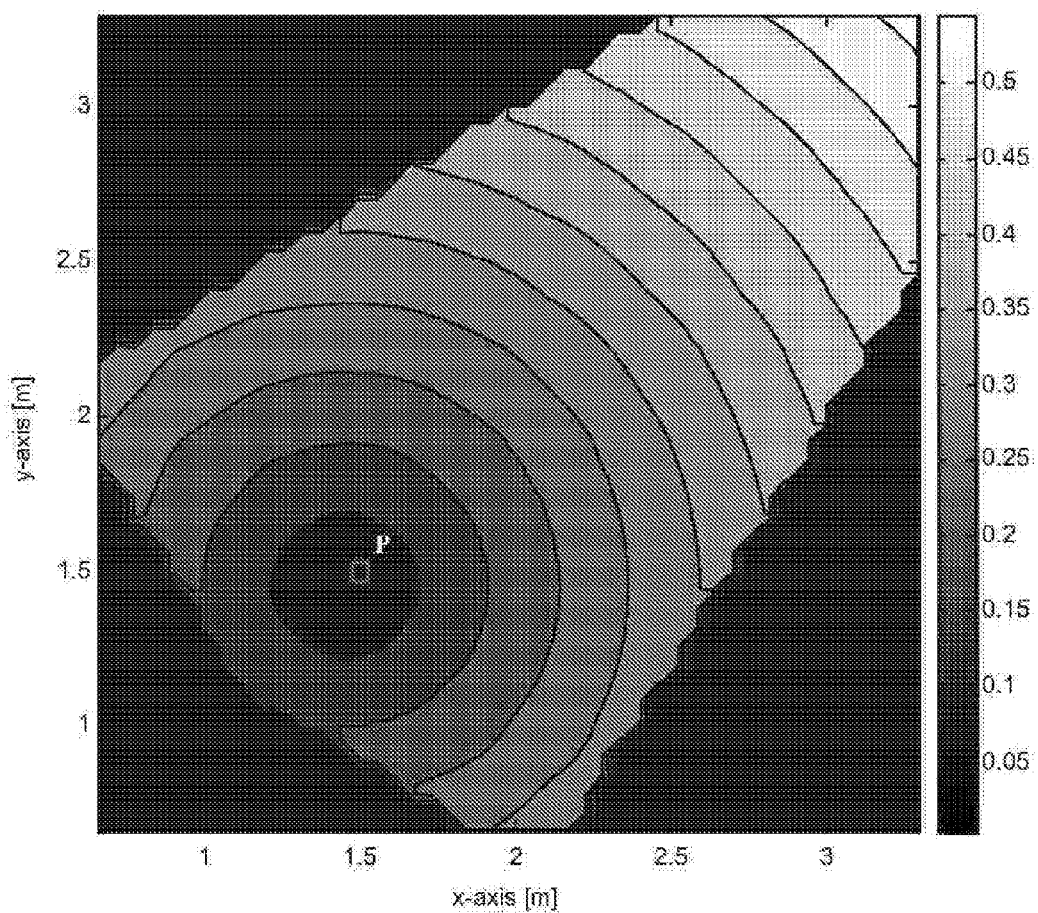
Figure 20:
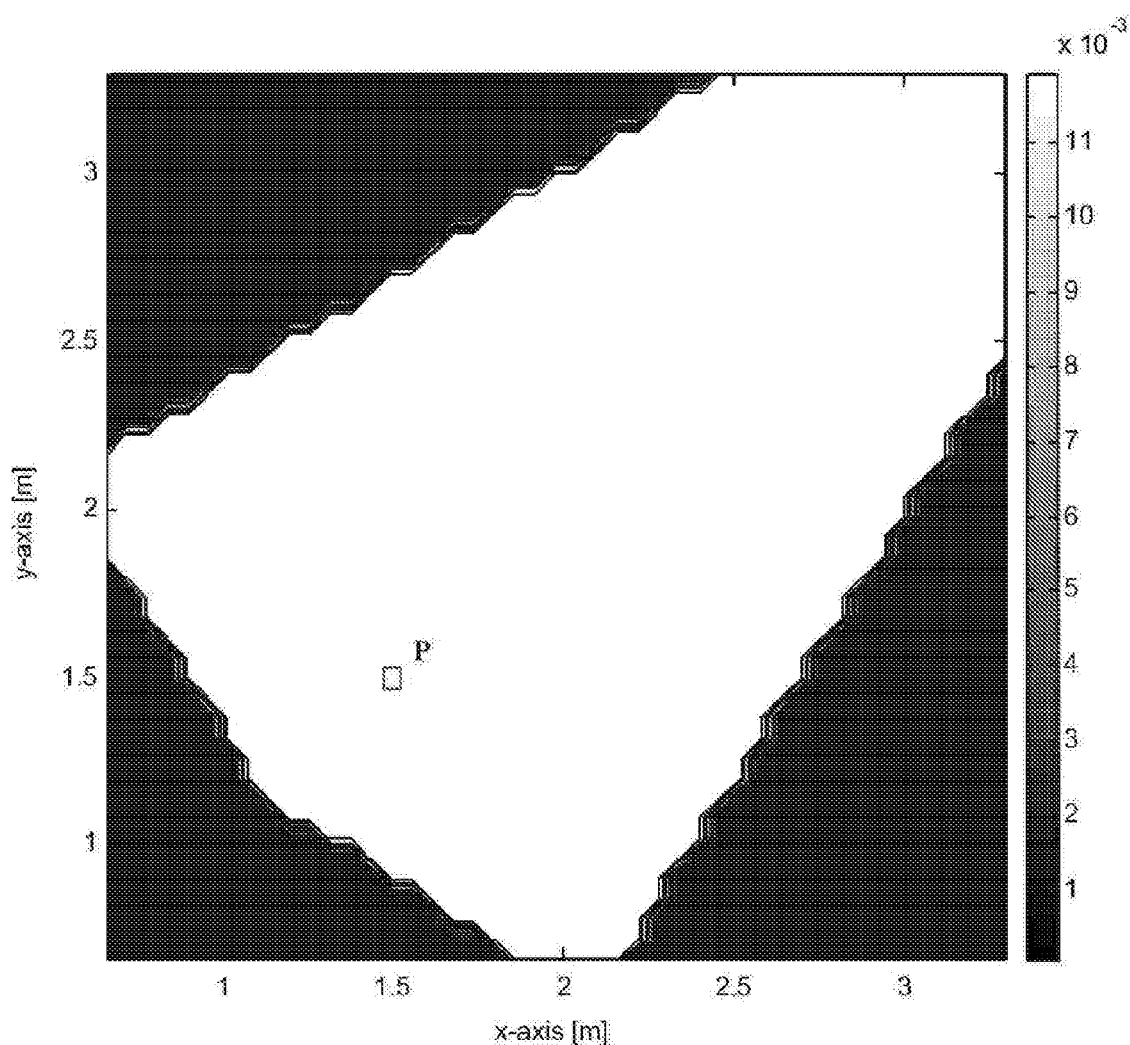
FIG. 20 illustrates how the error can be reduced significantly by the localization method according to an embodiment of the present invention.
Figure 21:
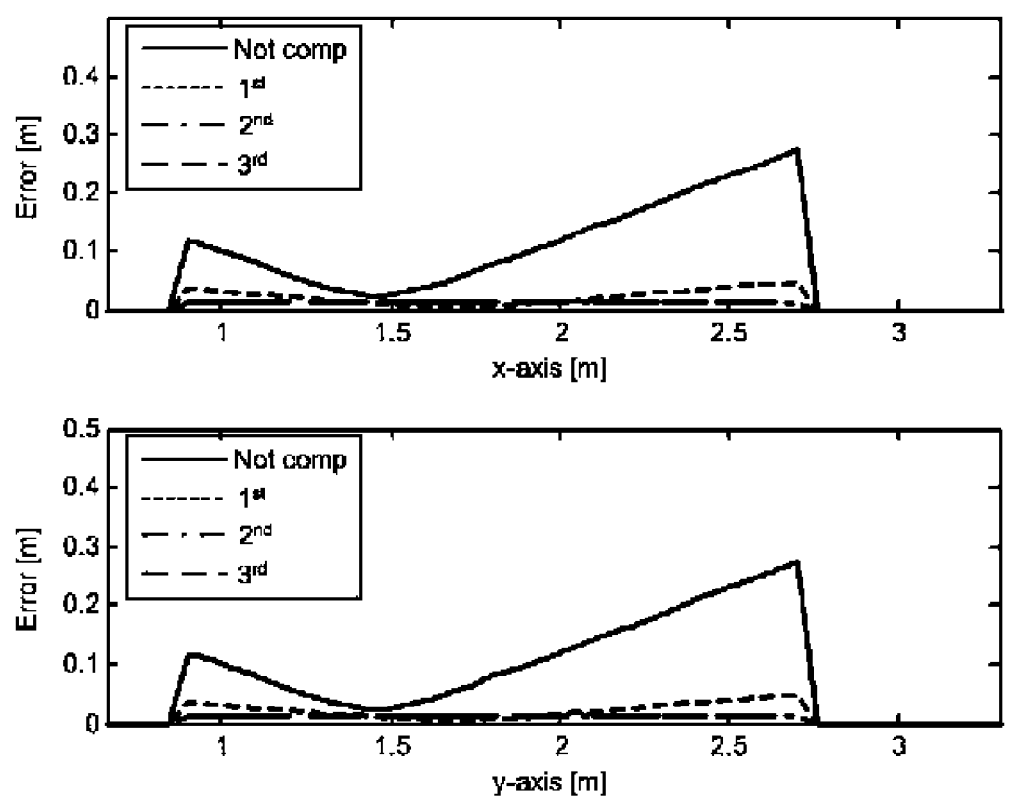
FIG. 21 illustrates the localization error reduction as a function of the number of iterations in the localization method according to an embodiment of the present invention.

FIG. 19 shows the error distribution without the compensation algorithm where two cameras are positioned at Oc1 (1.8, 0) and Oc2(0, 1.8). The actual object is located at (1.5, 1.5). FIG. 19 illustrates the amount of localization error in the x-axis, y-axis and both axes as a function of the reference coordinate. Since each camera has limited viewable angles, the reference coordinate, which cannot be shown on the outside of viewable angle, is marked as a black area. Note that the error is minimized when the reference points are close to the actual object point. The localization error can be further reduced with multiple iterations. FIG. 20 illustrates how the error can be reduced significantly. FIG. 21 shows the localization error reduction as a function of the number of iterations.

C. Object Tracking Performance

Figure 22:
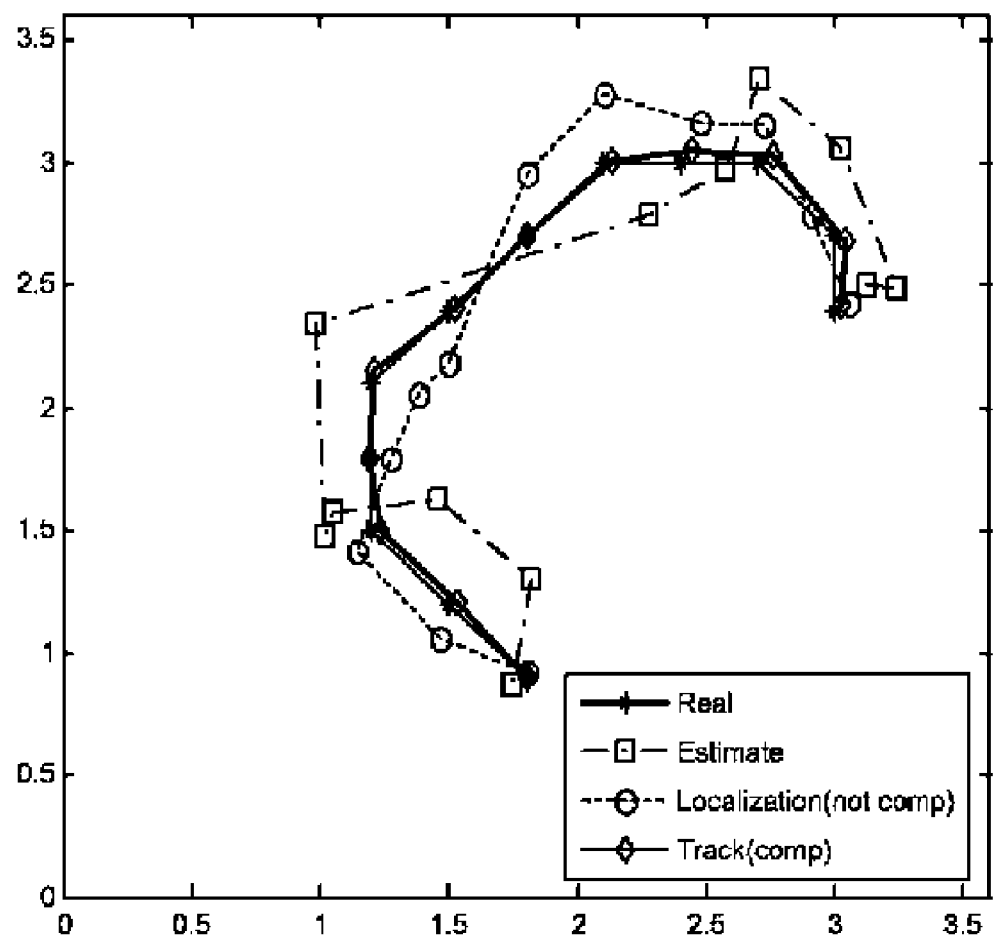
FIG. 22(a) illustrates the trajectory result of localization and FIG. 22(b) and FIG. 22(c) illustrate the tracking performance in the x-axis and the y-axis.
Figure 22:
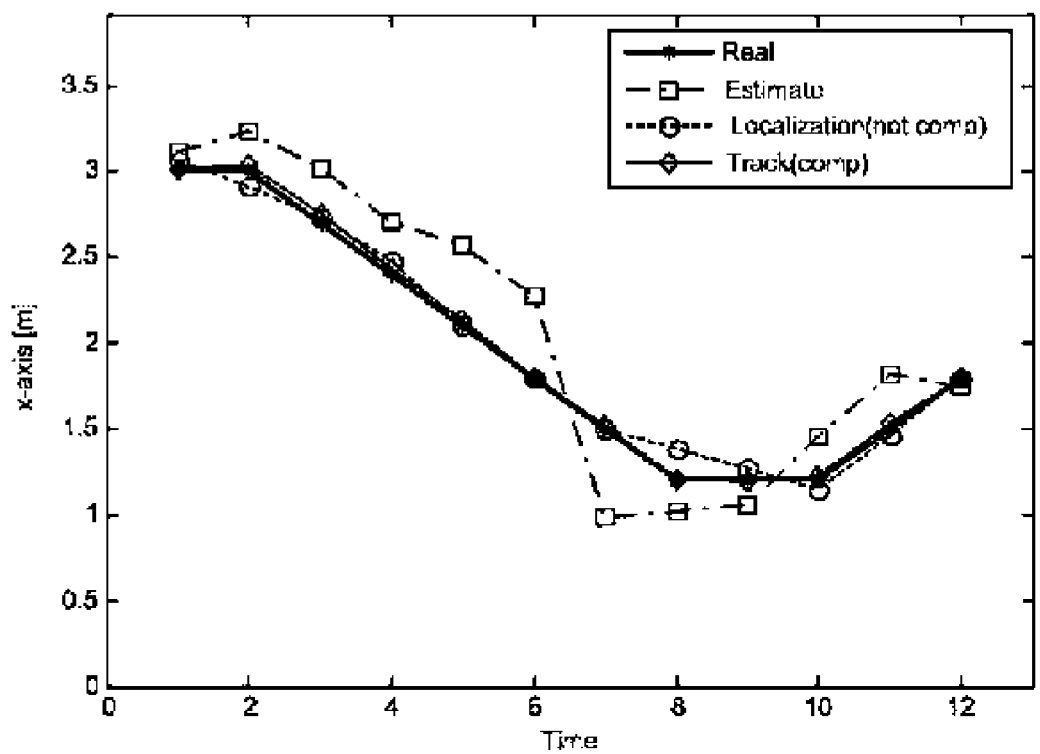
Figure 22:
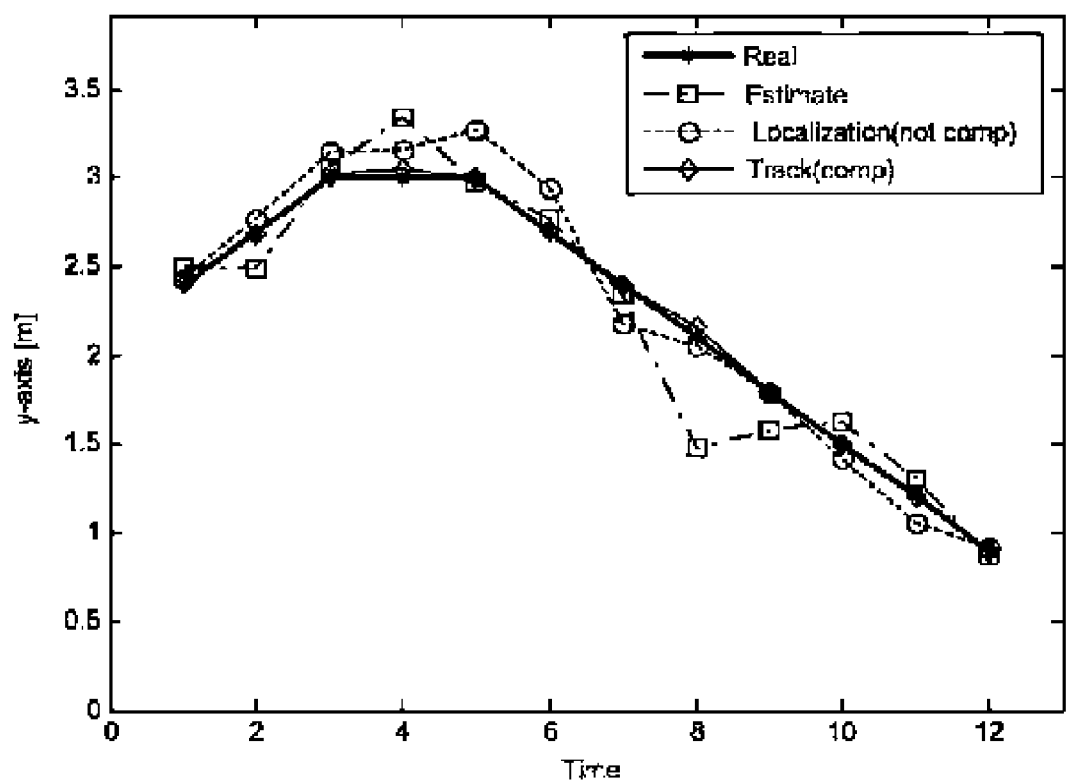
Figure 23:
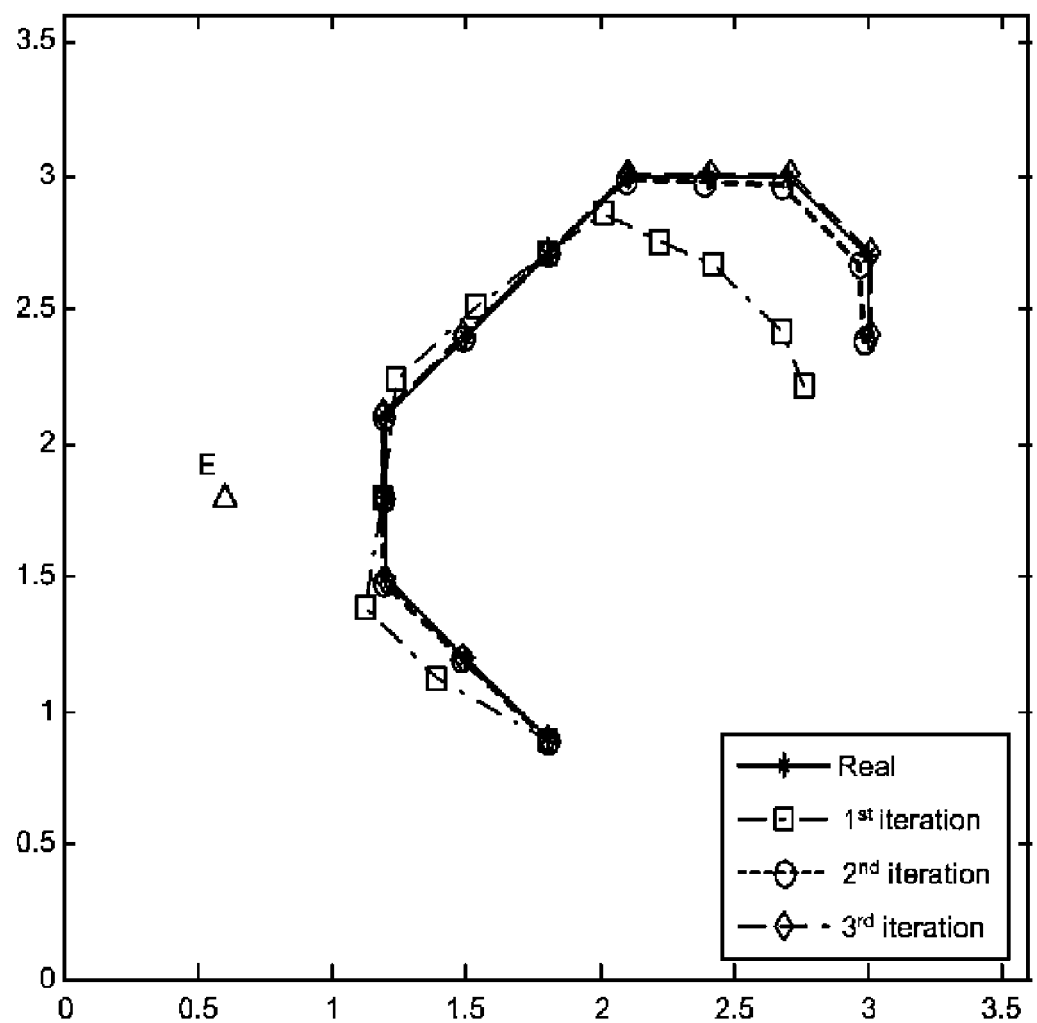
FIG. 23 illustrates the trajectory result of localization.

The proposed localization algorithm is also applied to a tracking example. In this example, an object moves within a 4 m×4 m area and the images are obtained from real cameras. Tracking problems may be compensated using the proposed non-iterative localization algorithm. Each time the object changes coordinates, its corresponding estimation is generated. FIG. 22(a) illustrates the trajectory result of localization. After the compensation, the tracking performance is improved. FIG. 22(b) and FIG. 22(c) illustrate the tracking performance in the x-axis and the y-axis. These figures clearly show that the compensation improves the tracking performance but the localization error still exists. Similarly, the proposed iterative localization algorithm is applied in the same tracking example. In this case, only one reference coordinate is used for the entire localization. The chosen estimate is outside of the trajectory as shown in FIG. 23. FIG. 23 illustrates the trajectory result of localization. There is a significant error with the one iteration since the estimated coordinate is not close to the object. Note that the error is increased if the object is further away from the estimated coordinate. However, successive iterations eliminate the localization error. As described above, there is provided an effective and simple method of localizing objects in an environment using visual images obtained from general digital imaging devices. In detail, the parallel projection model according to an embodiment of the present invention simplifies the complexity of calculation for determining positions of the objects supporting all zooming panning characteristics. In addition, the localization method according to an embodiment of the present invention fully compensates non-ideal characteristics such as optical characteristics of lens. Previous information called as reference coordinates may be one or a plurality of points varying with time obtained from a part of an estimation algorithm such as particle filtering. The visual localization according to an embodiment of the present invention may compensate obscurity. As described above, exemplary embodiments have been shown and described. Though specific terms are used herein, they are just used for describing the present invention but do not limit the meanings and the scope of the present invention disclosed in the claims. Therefore, it would be appreciated by those skilled in the art that changes may be made to these embodiments without departing from the principles and spirit of the invention. Accordingly, the technical scope of the present invention is defined by the claims and their equivalents.

[Industrial Applicability]

The present invention may be applied to the field of ubiquitous industry, and more particularly, to the field of localizing an object.

The invention claimed is:

1. A method of localizing an object, the method comprising:
projecting an object located on an object plane and a reference point corresponding to the object on a virtual viewable plane and an actual camera plane by using a plurality of sensors, wherein the respective planes support zooming and panning of imaging devices;
estimating coordinates of the reference point;
determining a relationship between a location of the object and the coordinates of the reference point, wherein when the location of the object is identical to a location of the reference point, the location of the reference point is determined as the location of the object; and
mutually compensating a difference in localization between the object projected by the plurality of sensors and the reference point,
wherein the plurality of sensors are selected based on a pan factor of each of the plurality of sensors.

2. The method of claim 1, wherein the virtual viewable plane is parallel to the object plane.

3. The method of claim 1, wherein sensors whose difference between absolute values of the pan factors is "0" are selected as the plurality of sensors.

4. The method of claim 1, which is performed one time.

5. The method of claim 1, which is performed iteratively.

* * * * *

UNITED STATES PATENT AND TRADEMARK OFFICE
CERTIFICATE OF CORRECTION

PATENT NO. : 8,432,443 B2  
APPLICATION NO. : 12/918535  
DATED : April 30, 2013  
INVENTOR(S) : Yun Young Nam et al.

Page 1 of 1

It is certified that error appears in the above-identified patent and that said Letters Patent is hereby corrected as shown below:

(1) On the Title page, Item (75), delete all "Suwon-si", replace all with -- Gyeonggi-do --.

In the Specification (2) Column 4, line 39, delete "to";

(3) Column 7, line 32, replace 11 with *1*1;

(4) Column 7, line 33, replace 12 with *1*2;

(5) Column 7, line 55, replace 11 and 12 with *1*1 and *1*2;

(6) Column 8, line 9, replace $1_1$ and $1_2$ with $l_1$ and $l_2$;

(7) Column 8, lines 14-15, replace $1_1$ and $1_2$ with $l_1$ and $l_2$;

(8) Column 8, line 17, replace $1_1$ and $1_2$ with $l_1$ and $l_2$.

Signed and Sealed this  
Twenty-second Day of July, 2014

Michelle K. Lee  
*Deputy Director of the United States Patent and Trademark Office*